United States Patent
Muto

(10) Patent No.: US 9,646,765 B2
(45) Date of Patent: May 9, 2017

(54) COIL WINDING DEVICE AND WINDING METHOD THEREOF

(71) Applicant: NITTOKU ENGINEERING CO., LTD., Saitama (JP)

(72) Inventor: Kenichi Muto, Fukushima (JP)

(73) Assignee: NITTOKU ENGINEERING CO., LTD., Saitama (JP)

(*) Notice: Subject to any disclaimer, the term of this patent is extended or adjusted under 35 U.S.C. 154(b) by 203 days.

(21) Appl. No.: 14/656,270

(22) Filed: Mar. 12, 2015

(65) Prior Publication Data
US 2015/0270063 A1    Sep. 24, 2015

(30) Foreign Application Priority Data
Mar. 24, 2014  (JP) .................................. 2014-59631

(51) Int. Cl.
| | | |
|---|---|---|
| B21F 3/04 | (2006.01) | |
| H01F 41/086 | (2016.01) | |
| H01F 41/071 | (2016.01) | |
| H02K 15/04 | (2006.01) | |

(52) U.S. Cl.
CPC .............. *H01F 41/086* (2016.01); *B21F 3/04* (2013.01); *H01F 41/071* (2016.01); *H02K 15/0435* (2013.01)

(58) Field of Classification Search
CPC ...... H01F 41/06; H01F 41/064; H01F 41/071; H01F 41/073; H01F 41/082; H01F 41/086; H01F 41/088; H02K 15/04; H02K 15/08; H02K 15/0435; H02K 15/045; B21F 3/00; B21F 3/04; B21F 3/10
See application file for complete search history.

(56) References Cited

U.S. PATENT DOCUMENTS

| | | | | |
|---|---|---|---|---|
| 1,367,814 A | * | 2/1921 | Hathaway | ................ B21F 3/06 140/1 |
| 4,917,316 A | * | 4/1990 | Suzuki | ..................... G11B 5/17 242/434.8 |
| 5,297,747 A | * | 3/1994 | Long | ...................... H01F 41/08 242/434.8 |
| 5,573,200 A | * | 11/1996 | Sato | ......................... G11B 5/17 242/434.8 |

FOREIGN PATENT DOCUMENTS

| | | |
|---|---|---|
| JP | 2002-158131 A | 5/2002 |
| JP | 2002-354762 A | 12/2002 |

OTHER PUBLICATIONS

JP 2002-354762A, translation, Dec. 6, 2002.*

* cited by examiner

*Primary Examiner* — Edward Tolan
(74) *Attorney, Agent, or Firm* — Rabin & Berdo, P.C.

(57) ABSTRACT

The coil winding device includes a nozzle configured to feed a wire to wind the wire around the winding core to form a coil, a plurality of hook rods disposed in predetermined intervals around an end part of the winding core, the wire drawn out from an edge of the coil being configured to be hooked to each of the plurality of hook rods during a forming process of the coil, a winding core rotating mechanism configured to rotate the winding core together with the plurality of hook rods, a hook rod rotating mechanism configured to rotate the plurality of the hook rods, and a wire drawing-out mechanism configured to draw out the wire from the edge of the coil and hook the wire on the hook rods during the forming process of the coil.

10 Claims, 18 Drawing Sheets

COIL WINDING DEVICE AND WINDING METHOD THEREOF

BACKGROUND OF THE INVENTION

Field of the Invention

The present invention relates to a winding device and a winding method for a coil for use in for example rotors such as a coreless motor.

Description of the Related Art

There traditionally has been a demand for coils in a rotor of small sized coreless motors to have high shape accuracy. A manufacturing method for a coil of this type includes a method of successively winding wire obliquely around an outer circumference of a winding core, to wind a tubular shaped coil. A winding device used in this method includes a nozzle that relatively rotates with respect to the winding core while feeding the wire, and a winding core rotating mechanism that causes the winding core to relative rotate.

On the other hand, in the coil winding method using such a device, there is a need to let out a lead wire (tap) of the coil while the wire is being wound. The lead wire is soldered onto a terminal of a commutator. In this case, twisting and like work on the lead wire of the coil is carried out by hand. Accordingly, the Applicant of the present application provided a coil winding device and winding method that enables easy and accurate formation of the lead wire (for example, see JP2002-354762A).

This winding device and method includes, in a coil shaping process, drawing-out means for drawing out a lead wire from an edge of a coil, and twisting means for twist shaping the drawn out lead wire. The drawing-out means further includes a plurality of hook rods aligned in predetermined intervals along an edge of the winding core and moving means for moving the hook rods between a hooking position at which the wire is hooked and a displacement terminated position of the drawing-out operation. By automatically performing the drawing out and the twist shaping of the lead wire, the lead wire can be formed easily and precisely.

SUMMARY OF THE INVENTION

However, in the drawing-out means of the traditional winding device and winding method, the nozzle is moved rotationally to feed the wire through the nozzle and to engage the wire on the hook rod in a state in which the hook rod is moved to the hooking position. In other words, in order to draw out the wire from the edge of the coil, the rotational movement of the nozzle that forms the coil by successively winding the fed wire to surroundings of the winding core is once stopped, to move the hook rod to the hooking position, and then the nozzle is again rotated to feed and engage the wire onto the hook rod.

The rotational movement of the nozzle is once stopped to draw out the lead wire and the rotational movement is restarted to engage the wire on the hook rod thereafter, and further the rotational movement of the nozzle has to be stopped again to twist and shape the lead wire, which twisting is carried out by rotating the hook rod in that state. Repetition of such starting and stopping of the rotational movement of the nozzle to draw out the wire would cause an increase in the time required to twist the lead wire; with a coil in which a plurality of lead wires are formed, there remained an unsolved problem that the time required for forming the lead wire increases.

An object of the present invention is to provide a coil winding device and a winding method thereof that can shorten the time required for forming the lead wire.

According to one aspect of the present invention, the coil winding device includes a nozzle configured to feed a wire to successively wind the wire obliquely around the winding core to form a coil by moving rotationally around a winding core along a track slanted with respect to a center line of the winding core, a plurality of hook rods disposed in predetermined intervals around an end part of the winding core, the wire drawn out from an edge of the coil being configured to be hooked to each of the plurality of hook rods during a forming process of the coil, a winding core rotating mechanism configured to rotate the winding core together with the plurality of hook rods, a hook rod rotating mechanism configured to rotate the plurality of the hook rods separately from the winding core to twist the wire hooked onto the hook rods, and a wire drawing-out mechanism configured to draw out the wire from the edge of the coil and hook the wire on the hook rods during the forming process of the coil. The wire drawing-out mechanism includes a hook hand being capable of hooking the wire hooked across the edge of the coil and the nozzle on the hook rods, and a moving mechanism configured to move the hook hand in directions of three axes.

According to another aspect of the present invention, a winding method includes successively winding a wire fed through a nozzle moved rotationally around a winding core along a track slanted with respect to a center line of the winding core, the wire being wound obliquely around the winding core to form a coil, hooking the wire drawn out from an edge of the coil on a hook rod, and twisting the wire hooked on the hook rod by rotating the hook rod for a predetermined number of times. The hooking hooks the wire hooked across the edge of the coil and the nozzle on a hook hand, and moves the hook hand in directions of three axes to hook the wire hooked on the hook hand on the hook rod.

DETAILED DESCRIPTION OF THE PREFERRED EMBODIMENTS

Described below is an embodiment of the present invention with reference to the accompanied drawings.

Figure 5:
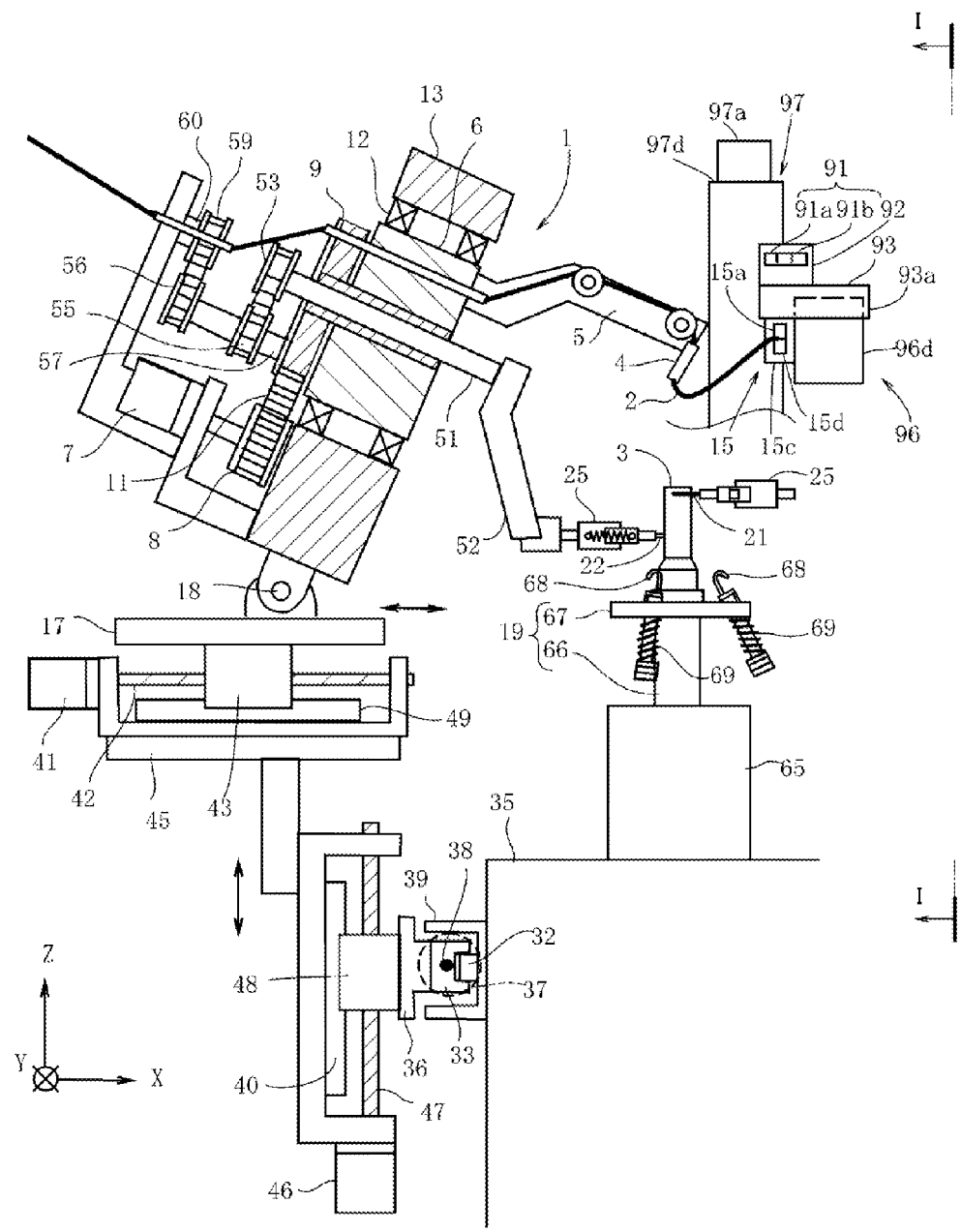
FIG. 5 is a longitudinal cross sectional view of a winding device in an embodiment of the present invention.
Figure 6:
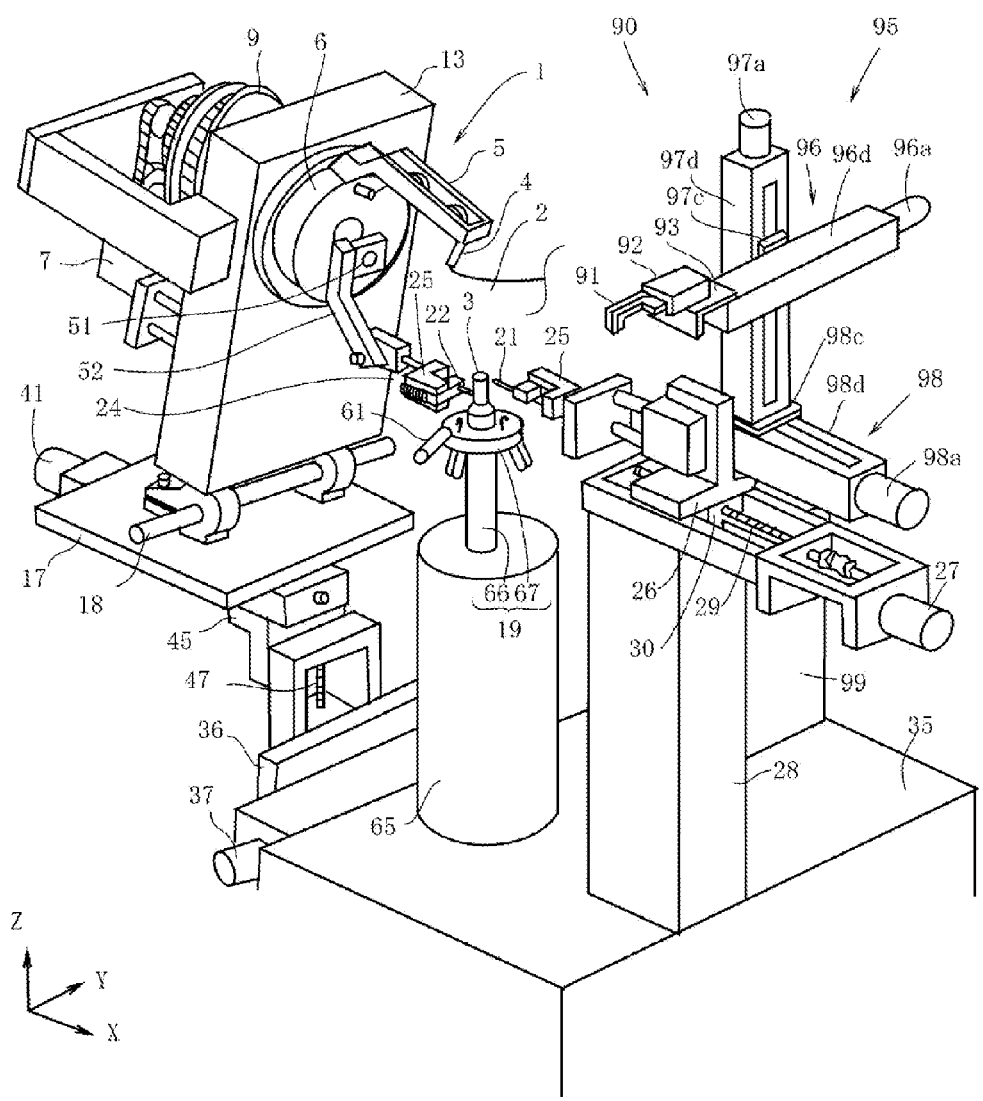
FIG. 6 is a perspective view showing a winding device in an embodiment of the present invention.

As shown in FIG. 5 and FIG. 6, a coil winding device 1 of the present embodiment is what is called a flyer winding device, which automatically manufactures a coil 10 (FIG. 18) for use in for example a rotor of a coreless motor. The winding device 1 includes a flyer 5 that moves rotationally around a winding core 3, and a nozzle 4 that feeds a wire 2 from the tip of the flyer 5. The winding device 1 is configured so that the wire 2 fed through the nozzle 4 is successively wound obliquely around the outer circumference (surroundings) of the winding core 3 by the nozzle 4 moving obliquely rotationally around the winding core 3 by the flyer 5, that is to say, the nozzle 4 moving rotationally around the winding core 3 in a track slanted with respect to a center line of the winding core 3, in a state in which one end of the wire 2 is secured to the winding core 3.

A base end section of the flyer 5 is coupled to a spindle (rotating shaft) 6. The spindle 6 is supported in a rotatable state to a flyer support base 13 via bearings 12. The spindle 6 is rotationally driven by a motor 7 via pulleys 8 and 9 and a belt 11.

The flyer support base 13 is fixed to a horizontally movable stand 17 via a shaft 18. It is configured so that the slant angle of the rotational track passed by the nozzle 4 can be adjusted by changing a mounted angle of the shaft 18 with respect to the horizontally movable stand 17.

Figure 16:
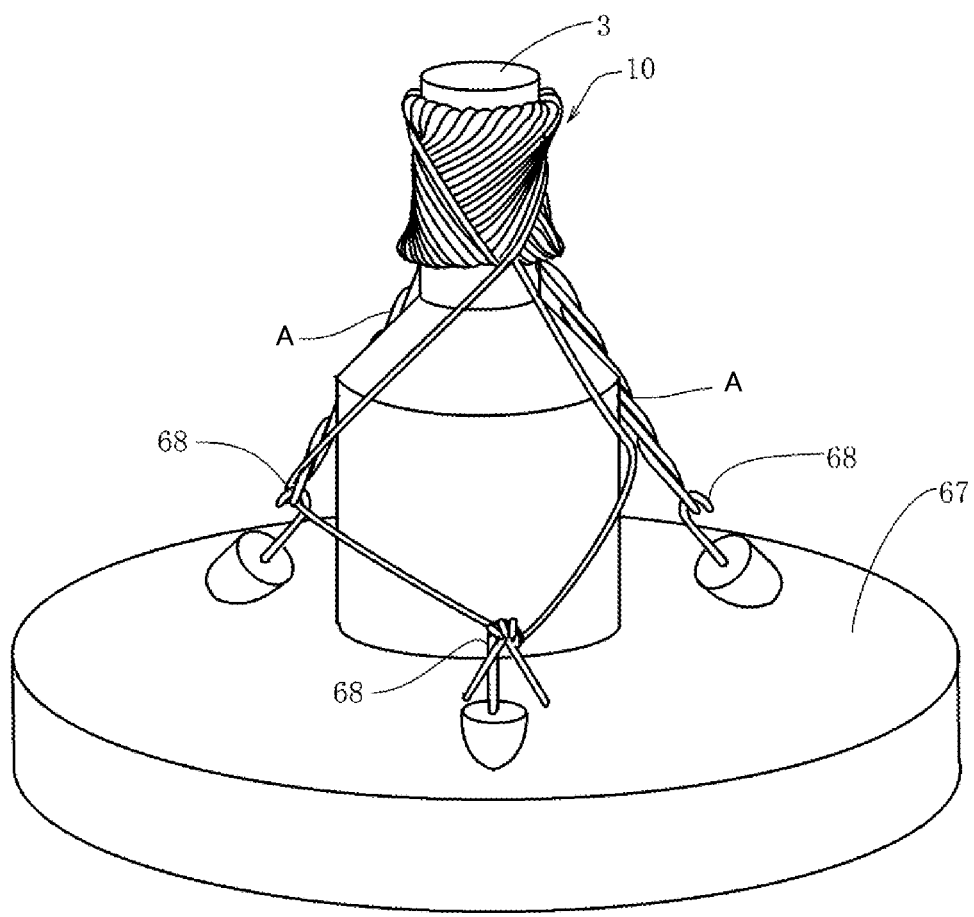
FIG. 16 is a view corresponding to FIG. 8, showing a state in which the wire completed in its winding is tied to a hook rod in an embodiment of the present invention.

The flyer support base 13 is to move in directions of the three axes of X, Y, and Z, in accordance with the shapes and sizes of the coil 10 that is wound around the winding core 3 (FIG. 16). The flyer support base 13 includes a horizontally movable stand 17 that moves in an X-axis direction, a lift base 45 that moves in a Z-axis direction, and a back-and-forth movable stand 36 that moves in a Y-axis direction.

The horizontally movable stand 17 is supported movably along the lift base 45 in the X-axis direction, along a guide rail 49. The lift base 45 has a ball screw 42 fit thereon, which ball screw 42 is rotationally driven by a servo motor 41. The horizontally movable stand 17 has a nut 43 fixed thereto, which nut 43 is screwed to the ball screw 42 via a plurality of balls.

The lift base 45 is supported movably along the back-and-forth movable stand 36 in the Z-axis direction, along a guide rail 40. The lift base 45 has a ball screw 47 fit thereon, which ball screw 47 is rotationally driven by a servo motor 46. The back-and-forth movable stand 36 has a nut 48 fixed thereon, which nut 48 is screwed to the ball screw 47 via a ball.

The back-and-forth movable stand 36 is supported movably along a frame 35 in the Y-axis direction, along a guide rail 32. The frame 35 has a case 39 that is fit with a ball screw 38 that is rotationally driven by a servo motor 37. The back-and-forth movable stand 36 has a nut 33 fixed thereon, which nut 33 is screwed to the ball screw 38 via a ball.

As a winding core rotating mechanism that causes the winding core 3 to rotate about the Z-axis together with the hook rod 68, a rotating base 19 that rotates about the Z-axis is set up on a table 65 on the frame 35. This rotating base 19 is rotationally driven by a servo motor (not illustrated) disposed inside the table 65. The rotating base 19 is constituted of a rotation center shaft 66 and a disk section 67 provided at a middle part of the rotation center shaft 66. The winding core 3 is set detachable on an upper part of the rotation center shaft 66 on the rotating base 19, via a jig.

Every time the nozzle 4 moves rotationally obliquely around the winding core 3 by the flyer 5, the rotating base 19 is controlled to rotate the winding core 3 by a predetermined angle. This allows for successively winding the wire 2 obliquely around the outer circumference of the winding core 3 to form the tubular coil 10 (FIG. 16).

Moreover, the winding device 1 of the present embodiment includes a first wire hooking member 21 and a second wire hooking member 22 as pin-shaped objects that guide the wire 2 to be wound around the outer circumference of the winding core 3 via the nozzle 4.

Figure 7:
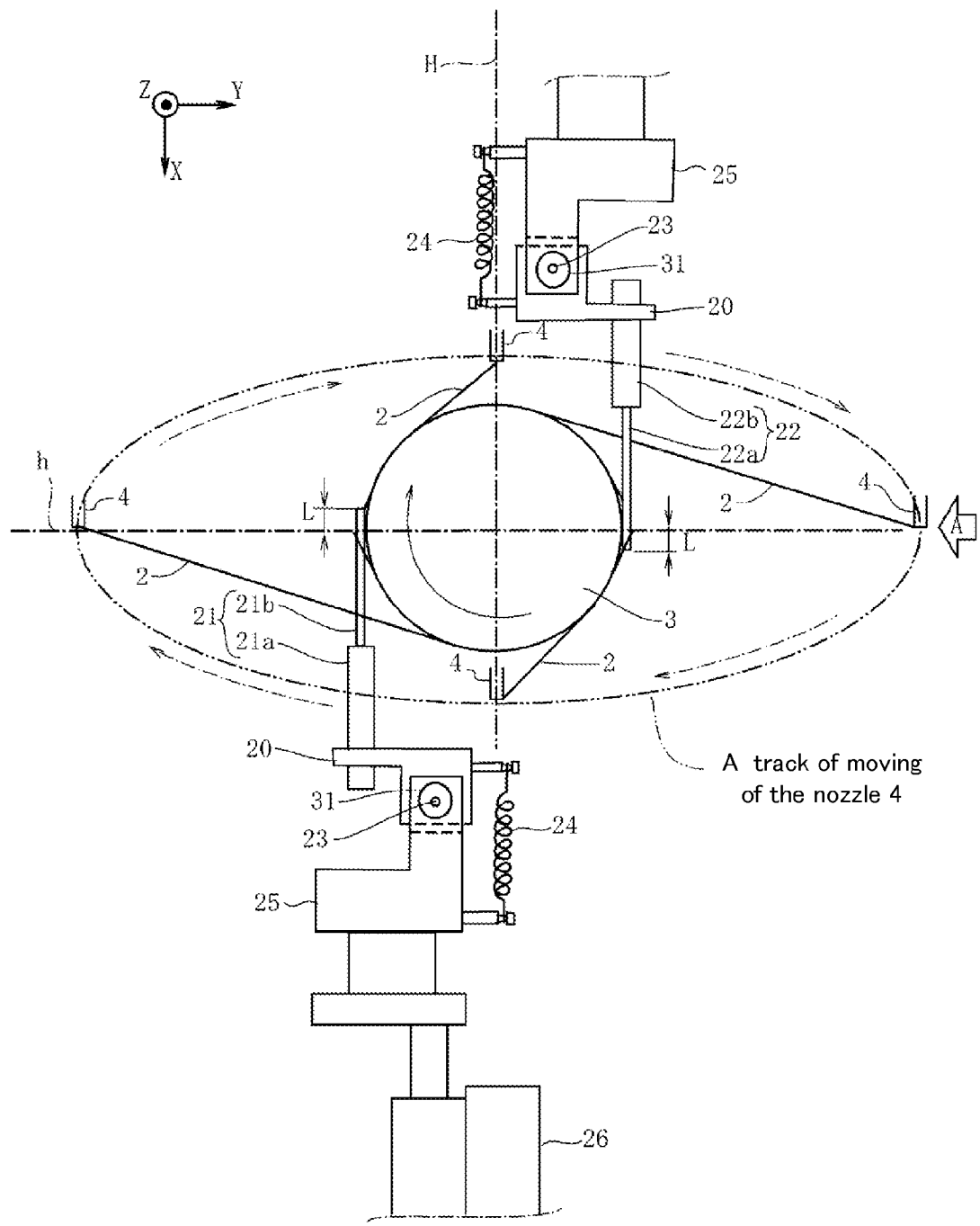
FIG. 7 is a top view showing a relationship between a winding core and wire hooking members of a winding device in an embodiment of the present invention.

As shown in FIG. 7, the first and the second wire hooking members 21 and 22 are disposed on either side of the winding core 3 so as to sandwich a plane H including both a center of rotation of the nozzle 4 and a center line of the winding core 3, such that the first wire hooking member 21 faces the second wire hooking member 22 by 180 degrees, with the winding core 3 sandwiched therebetween. The first wire hooking member 21 is disposed abutting an upper part of the winding core 3, and the second wire hooking member 22 is disposed abutting a lower part of the winding core 3 (FIG. 5).

Therefore, the abutting sections of the first and the second wire hooking members 21 and 22 with respect to the winding core 3 are located on one plane h that includes a rotation center line of the winding core 3. In this case, the plane h intersects at right angles with the aforementioned plane H. Further, by the nozzle 4 causing the wire 2 to wind on the outer circumference of the winding core 3 via the first and the second wire hooking members 21 and 22, the wire 2 is fitted in a predetermined position on the outer circumference of the winding core 3.

The "wire hooking member" of the present embodiment has a function to guide the wire wound around twice or three times to move from its tip towards the winding core. Furthermore, the wire hooking member achieves an action and effect of enabling the wire 2 wound two or three rounds around the wire hooking member to be brought in close contact to each other to allow secure fusing of the wire by hot air while guiding the wire towards the winding core.

As shown in FIG. 7, the first and the second wire hooking members 21 and 22 are pin-shaped objects that extend in a tangential direction of the winding core 3. This embodiment shows that the first and the second wire hooking members 21 and 22 are constituted of large-diameter sections 21a and 22a on a base end side, and small-diameter pin sections 21b and 22b on a tip side that are formed on the same axis continuing from the large-diameter portions 21a and 22a and are disposed abutting the winding core 3. The first and the second wire hooking members 21 and 22 constituted of these pin-shaped objects are provided such that the large-diameter portions 21a and 22a being the base ends are attached to the support base 20, with the small-diameter pin portions 21b and 22b on the tip side directed in the rotating direction of the winding core 3. This support base 20 is pivotally supported by a bracket 25.

Moreover, the winding device 1 of the present embodiment includes an abutting angle changing mechanism that changes the abutting angles of the first and the second wire hooking members 21 and 22 while the first and the second wire hooking members 21 and 22 are abutted against the outer circumference of the winding core 3. The abutting angle changing mechanism in this embodiment includes a swinging center shaft 23 that supports the first and second wire hooking members 21 and 22 to the bracket 25 in a state enabling swinging of the first and second wire hooking members 21 and 22 via a bearing 31, a spring (energizing member) 24 that causes the tips of the first and the second wire hooking members 21 and 22 to be pressed against the winding core 3 with a slight amount of energizing force, and a swinging center shaft moving mechanism that moves the swinging center shaft 23 in the X-axis direction with respect to the winding core 3.

As shown in FIG. 7 and FIG. 6, the swinging center shaft moving mechanism that moves the swinging center shaft 23 of the first wire hooking member 21 in the X-axis direction with respect to the winding core 3 includes a support base 26 of the first wire hooking member 21 that moves the bracket 25 in the X-axis direction with respect to the winding core 3.

As shown in FIG. 6, the support base 26 is supported translatable along the X-axis direction with respect to a platform 28 fixed to the frame 35. The platform 28 has a ball screw 29 fitted thereto, which ball screw 29 is rotationally driven by a servo motor 27. The support base 26 has a nut 30 fixed thereon, which nut 30 is screwed onto the ball screw 29 via a ball.

As shown in FIG. 5, the swinging center shaft moving mechanism of the second wire hooking member 22 includes the horizontally movable stand 17 that moves the flyer support base 13 in the X-axis direction, a fixed shaft 51 provided penetrating through the spindle 6 of the flyer 5, a rotation locking mechanism of the fixed shaft 51, and an arm 52 that couples the bracket 25 to the fixed shaft 51. This allows for the swinging center shaft 23 (FIG. 7) to move in the X-axis direction together with the flyer support base 13.

The swinging center shafts 23 of the first and the second wire hooking members 21 and 22 are driven in the X-axis direction by the servo motors 27 and 41, respectively. This allows for finely controlling aspects such as the movement amount and speed of the swinging center shafts 23, which thus can achieve subtle movement of the first and the second wire hooking members 21 and 22.

The rotation locking mechanism that supports the fixed shaft 51 so that the fixed shaft 51 does not rotate with respect to the flyer support base 13 includes a pulley 53 fitted on a base end portion of the fixed shaft 51, a pulley 55 that operates in communication with the pulley 53 via a belt, a pulley 56 rotating integrally with the pulley 55, a shaft 57 supporting the pulleys 55 and 56 to the spindle 6 in a rotatable manner, a pulley 59 that operates in communication with the pulley 56 via a belt, and a shaft 60 that fixes the pulley 59 on the same axis as the pulley 53 of the flyer support base 13. The pulleys 53, 55, 56, and 59 are formed having identical diameters. This prevents the fixed shaft 51 from moving rotationally even if the pulleys 55 and 56 move rotationally together with the spindle 6.

The wire 2 supplied from a wire supply source not illustrated through a tensioner passes through a hole opened in the shaft 60 and the pulley 59 and passes through a hole opened in the spindle 6 to be guided to the nozzle 4 provided on the tip of the flyer 5. The pulleys 55 and 56 and like members move rotationally with the spindle 6, so they do not interfere with the wire 2.

On the other hand, as shown in FIG. 1 to FIG. 6, the disk section 67 of the rotating base 19 of the winding core 3 has hook rods (hooking member) 68 for forming a lead wire A (tap) (FIG. 18) of the coil 10. The hook rods 68 are disposed around a lower end part of the winding core 3 in predetermined intervals, in accordance with the number of lead wires to be drawn out. For example, if the number of slits in the commutator is three, the number of lead wires will be three, and three hook rods 68 will be disposed in predetermined intervals.

Moreover, the hook rods 68 have their tips formed in a hook shape having a predetermined curve, and rod sections thereof are inserted through the disk section 67 such that the rod sections are vertically movable. The rod sections have on their lower ends a gear 70. On the lower side of the disk section 67, springs 69 that energize the hook rods 68 downward are provided. This embodiment shows a case in which three hook rods 68 are inserted through the disk section 67 in a slant manner, in which the intervals between each other are broadened as the three hook rods 68 extend downward (FIG. 1 and FIG. 2).

Figure 2:
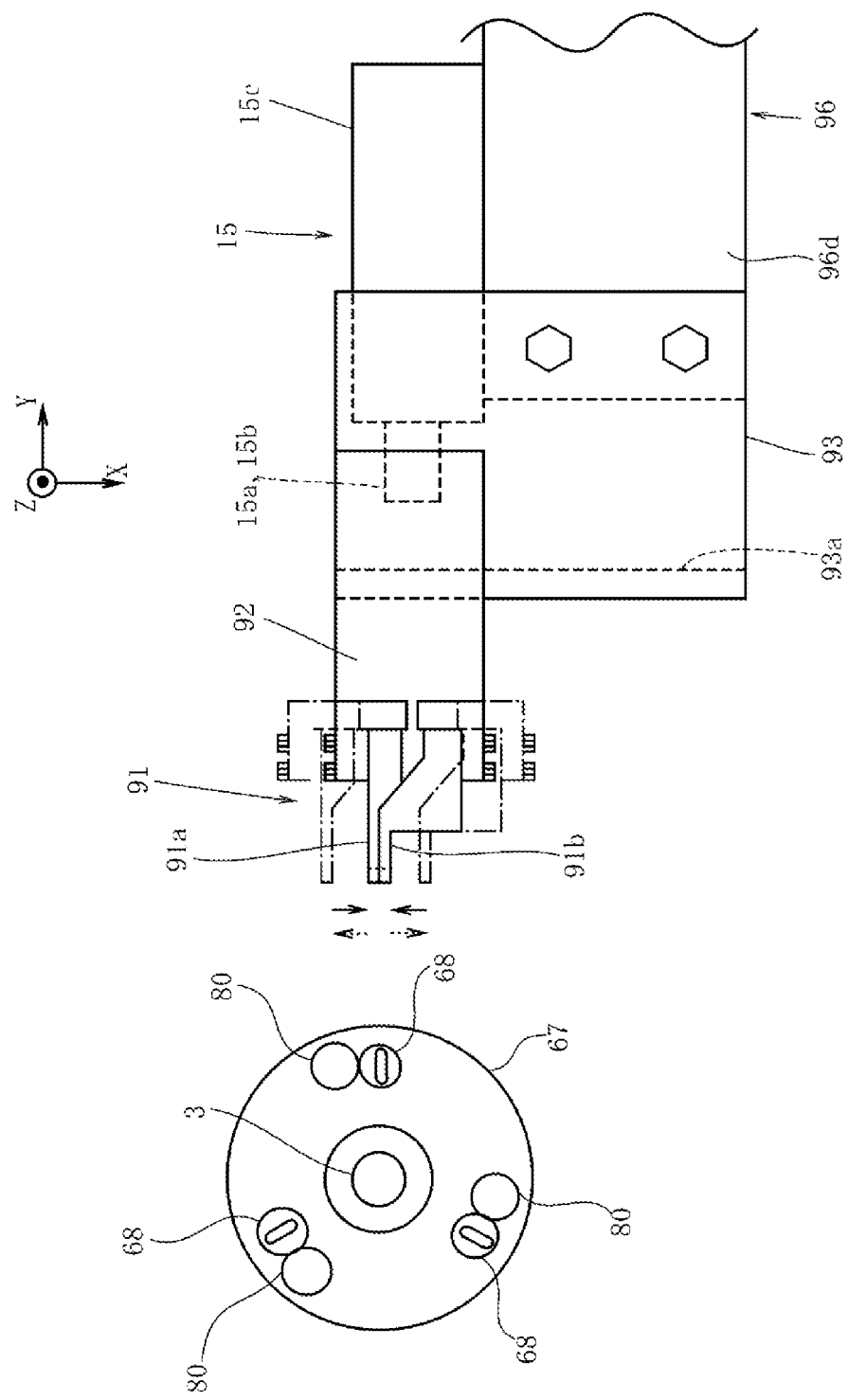
FIG. 2 is a top view showing an arrangement state of hook rods and a hook hand in an embodiment of the present invention.
Figure 3:
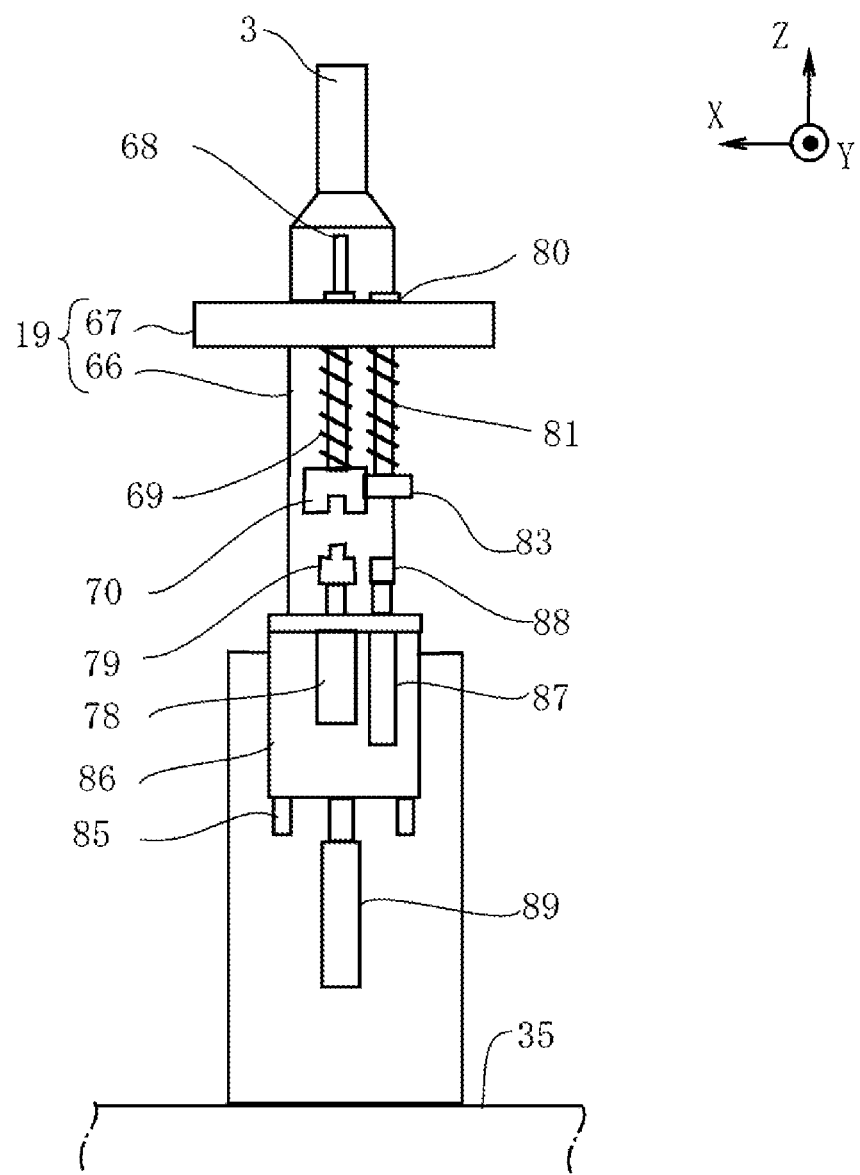
FIG. 3 is a view showing a rotation regulating mechanism in an embodiment of the present invention.
Figure 4:
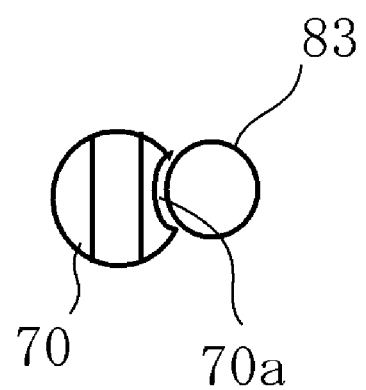
FIG. 4 is a view showing a rotation regulated state of a hook rod in an embodiment of the present invention.

As shown in FIG. 2 and FIG. 3, the disk section 67 of the rotating base 19 has slidable lock rods 80 provided along with the hook rods 68. The lock rods 80 have a rotation regulating member 83 (FIG. 3) on their lower edges. As shown in FIG. 4, the rotation regulating member 83 constitutes a rotation regulating mechanism that engages with an outer circumference concave portion 70a of a gear 70 and locks the rotation of the hook rod 68 in a state in which the rotation regulating member 83 is lowered by energizing force of the spring 81.

Figure 1:
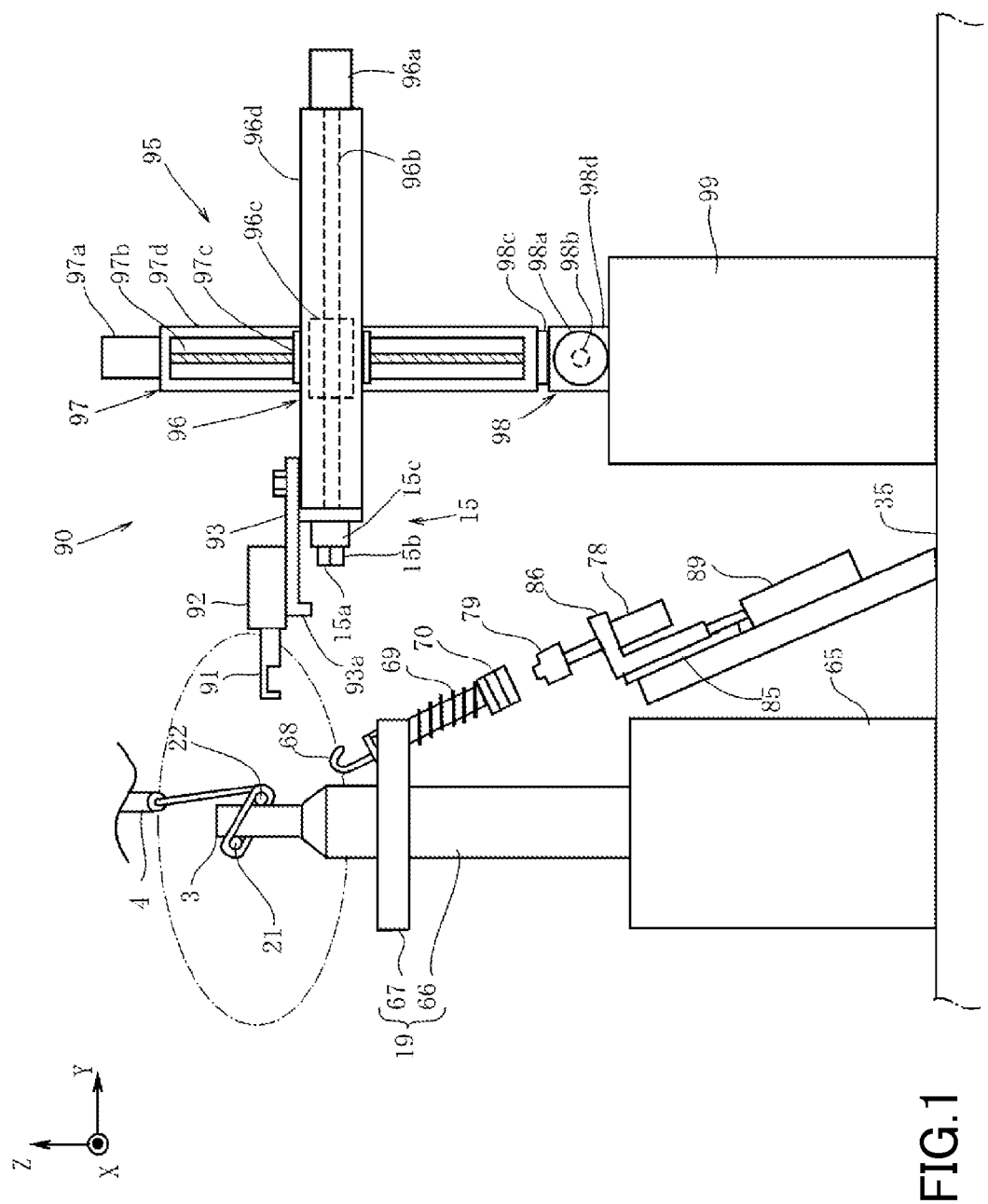
FIG. 1 is a cross sectional view taken on line I-I of FIG. 5, showing a wire drawing-out mechanism of a winding device in an embodiment of the present invention.

As shown in FIG. 1 and FIG. 3, the frame 35 has a tap movable stand 86 as moving means that changes in position via a rail 85 on an extending line from the hook rod 68 and the lock rod 80. The tap movable stand 86 is driven by an air cylinder 89.

As shown in FIG. 3, the tap movable stand 86 is attached with a gear (rotation transmitting section) 79 that is rotationally driven by a motor 78. The tap movable stand 86 is attached with an unlock rod 88 that pushes the lock rod 80 up by the air cylinder 87.

When detaching the lead wire (tap) of the coil 10 (FIG. 16), an air cylinder 89 is moved in an extending manner in predetermined large strokes when the hook rod 68 and the lock rod 80 are positioned on a line extending from the gear 79 and the unlock rod 88. This moves the tap movable stand 86 upwards, and the gear 79 abuts against the gear 70, which pushes the hook rod 68 up from an initial position (set in advance) to a predetermined position (detaching position that causes the wire to detach).

By moving the air cylinder 89 in a shrinking manner from the state in which the hook rod 68 is pushed up to the predetermined position (detaching position that causes the wire to detach), the tap movable stand 86 is lowered. This causes the gear 79 to separate from the gear 70 and return to its original position, and the hook rod 68 is pressed down to its initial position by the energizing force of the spring 69. The lock rod 80 moves up and down together with the hook rod 68, and when the rotation regulating member 83 engages with the outer circumference concave portion 70a of the gear 70 (FIG. 4), the rotation of the hook rod 68 is prohibited.

The winding device 1 includes a wire drawing-out mechanism 90 that draws out the wire 2 from the edge of the coil 10 and hooks the wire 2 on each of the hook rods 68 during the forming process of the coil 10. As shown in FIG. 1, the wire drawing-out mechanism 90 includes a hook hand 91 that can hook the wire 2 hooked across the edge of the coil 10 and the nozzle 4 onto the hook rod 68, and a moving mechanism 95 that enables the hook hand 91 to move in the directions of the three axes.

As shown in FIG. 1 and FIG. 2, the hook hand 91 is constituted of a first hook member 91a and a second hook member 91b that can be contacted to each other. The first and second hook members 91a and 91b in this embodiment are formed in a L-shape (FIG. 1) such that each of the first and second hook members 91a and 91b can hook the wire 2 hooked across the end part of the coil 10 to the nozzle 4 in the contacted state.

Moreover, the wire drawing-out mechanism 90 includes an contacting and separating mechanism 92 that allows for the first and second hook members 91a and 91b to move between the contacted state shown in the solid lines in FIG. 2 and a separated state shown in the alternate long and short dash lines in FIG. 2. The contacting and separating mechanism 92 in this embodiment is an air cylinder 92 that causes the first and second hook members 91a and 91b to move between the contacted state and the separated state by supplying and discharging compressed air. The supplying and discharging of the compressed air in the air cylinder 92 is controlled by a controller not illustrated.

As shown in FIG. 1, the moving mechanism 95 is constituted of a combination of expanding/contracting actuators 96 to 98 that expand in the X-axis, Y-axis, and Z-axis directions, respectively. In the expanding/contracting actuators 96 to 98, followers 96c to 98c that are screwed to the corresponding ball screws 96b to 98b move along longitudinal directions of the corresponding housings 96d to 98d, when the servo motors 96a to 98a are driven and the corresponding ball screws 96b to 98b rotate.

In this embodiment, the air cylinder 92 serving as the contacting and separating mechanism is mounted on a mounting board 93. The mounting board 93 is mounted on the housing 96d of the expanding/contracting actuator 96 in the Y-axis direction, so as to be movable in the Y-axis direction. Furthermore, the follower 96c of the expanding/contracting actuator 96 in the Y-axis direction is attached to the follower 97c of the expansion actuator 97 in the Z-axis direction. This enables the air cylinder 92 to move in the Z-axis direction together with the expanding/contracting actuator 96 in the Y-axis direction.

Moreover, a housing 97d of the expansion actuator 97 in the Z-axis direction is mounted on the follower 98c of the expansion actuator 98 in the X-axis direction. This enables the air cylinder 92 to move in the X-axis direction together with the expanding/contracting actuators 96 and 97 in the Y-axis and Z-axis directions. Furthermore, a housing 98d of the expansion actuator 98 in the X-axis direction extends in the X-axis direction and is fixed on the top of the frame 35 having a base platform 99 provided therebetween. Each of the servo motors 96a to 98a in the respective expanding/contracting actuators 96 to 98 is connected to a control output of a controller not illustrated, which controller controls the servo motors 96a to 98a.

The mounting board 93 whose base end is mounted on a housing 96d of the expanding/contracting actuator 96 in the Y-axis direction has a pressing member 93a formed thereto, which pressing member 93a is directed downwards from its projecting end. The pressing member 93a is provided in the vicinity of the hook hand 91, upon mounting the air cylinder 92 onto the mounting board 93, which air cylinder 92 causes the hook hand 91 to move. Further, the mounting board 93 is configured movable in the directions of the three axes by the moving mechanism 95, together with the pressing member 93a and the hook hand 91.

Figure 12:
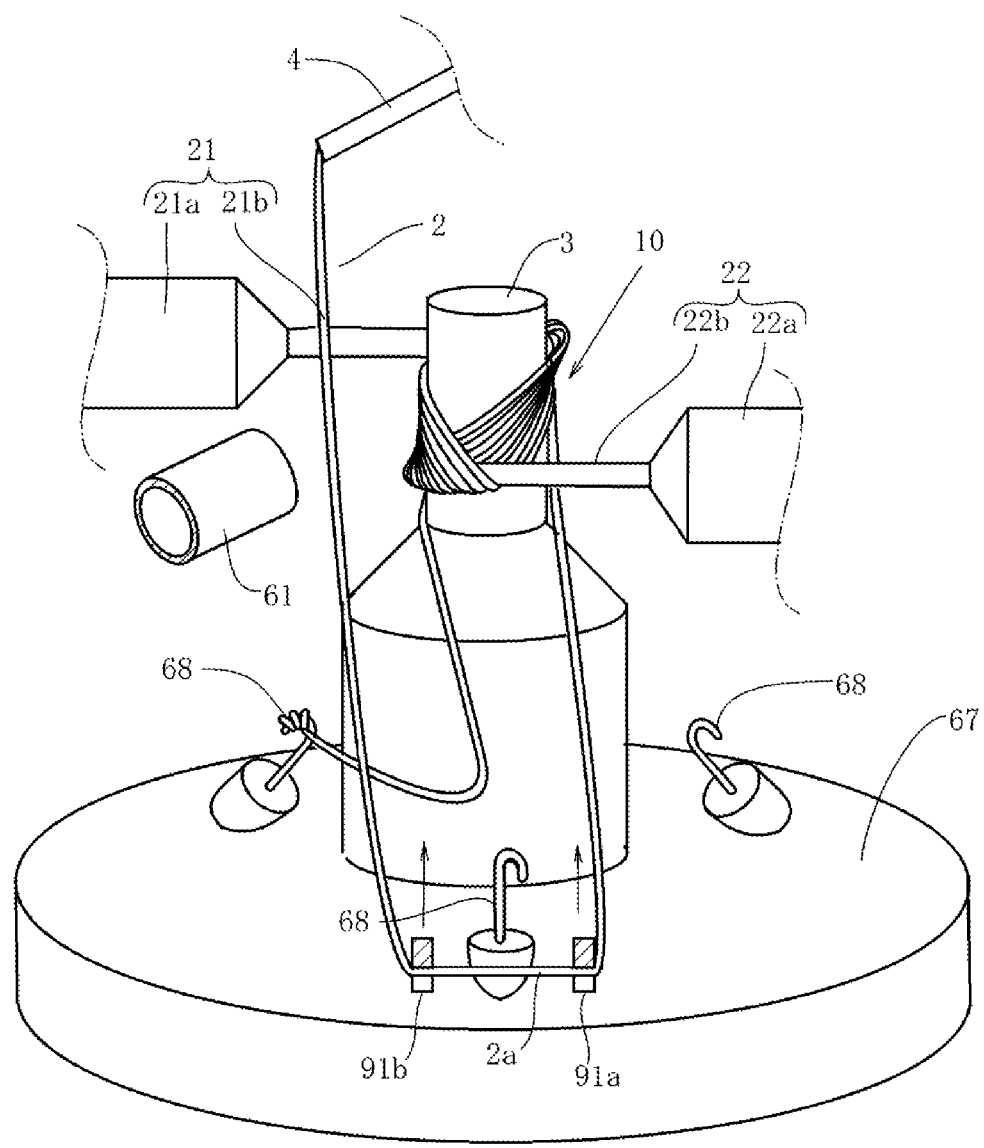
FIG. 12 is a view corresponding to FIG. 11, showing a state in which the wire is drawn out from the coil made of the wire wound about one third of the winding core and is hooked to the hook rods, in an embodiment of the present invention.

The first and the second hook members 91a and 91b of the hook hand 91 that hooks the wire 2 are then separated by the air cylinder 92, which hooks the wire 2 across the first and the second hook members 91a and 91b (FIG. 12). The moving mechanism 95 moves the hook hand 91 in this state, to hook the wire 2 hooked across the first and second hook members 91a and 91b on the hook rod 68.

Moreover, the tap movable stand 86 disposes a hook rod rotating mechanism that twists the wire 2 hooked onto the hook rod 68 by the wire drawing-out mechanism 90 to form a lead wire A (FIG. 16). The hook rod rotating mechanism in this embodiment is the twisting motor (servo motor) 78 mounted on the tap movable stand 86 and the gear (rotation transmitting section) 79 mounted on its shaft, as shown in FIG. 1 and FIG. 3.

When the lead wire A (FIG. 16) is twist shaped by twisting the wire 2 hooked on the hook rod 68 by the wire drawing-out mechanism 90, the tap movable stand 86 moves upwards as a result of the air cylinder 89 moving in an extending manner in predetermined small strokes. This allows for the gear 79 to mesh with the gear 70 without pressing the hook rod 68 upwards.

By moving the air cylinder 87 in the extending manner in this state, the unlock rod 88 pushes the lock rod 80 up to release the rotation regulation of the hook rod 68. By rotating the twisting motor 78 for a predetermined amount of times (set in advance) in this state, the hook rod 68 is rotated due to the gears 79 and 70, thereby twist shaping the lead wire A.

Once the twisting shaping is completed, the air cylinder 87 is shrunk. This causes the lock rod 80 to move downwards and again lock the rotation of the hook rod 68. As such, the wire 2 hooked onto the hook rod 68 can be twisted by rotating the hook rod 68 separately from the winding core 3 by the hook rod rotating mechanism.

As shown in FIG. 1, FIG. 2 and FIG. 5, the winding device 1 of the present embodiment includes a clamping mechanism 15 that can hold the wire 2 drawn out from the tip of the nozzle 4. This clamping mechanism 15 is an air cylinder in which a pair of gripping pieces 15a and 15b is separated or approximated by supplying and discharging compressed air. A body 15c of the clamping mechanism 15 is attached to the housing 96d of the expanding/contracting actuator 96 in the Y-axis direction constituting the moving mechanism 95.

Further, the moving mechanism 95 is configured such that the clamping mechanism 15 can move in the directions of the three axes together with the pressing member 93a and the hook hand 91.

Referring back to FIG. 6, the winding device 1 of the present embodiment includes a duct 61 that blows hot air towards the winding core 3. The surface of the wire 2 is coated with a welding layer. Adjacent parts of the wire 2 wound around the winding core 3 can be adhered together by the welding layer being melted by the hot air from the duct 61 and being fixed.

Next described is a method of the present embodiment of winding with use of the winding device 1.

Figure 11:
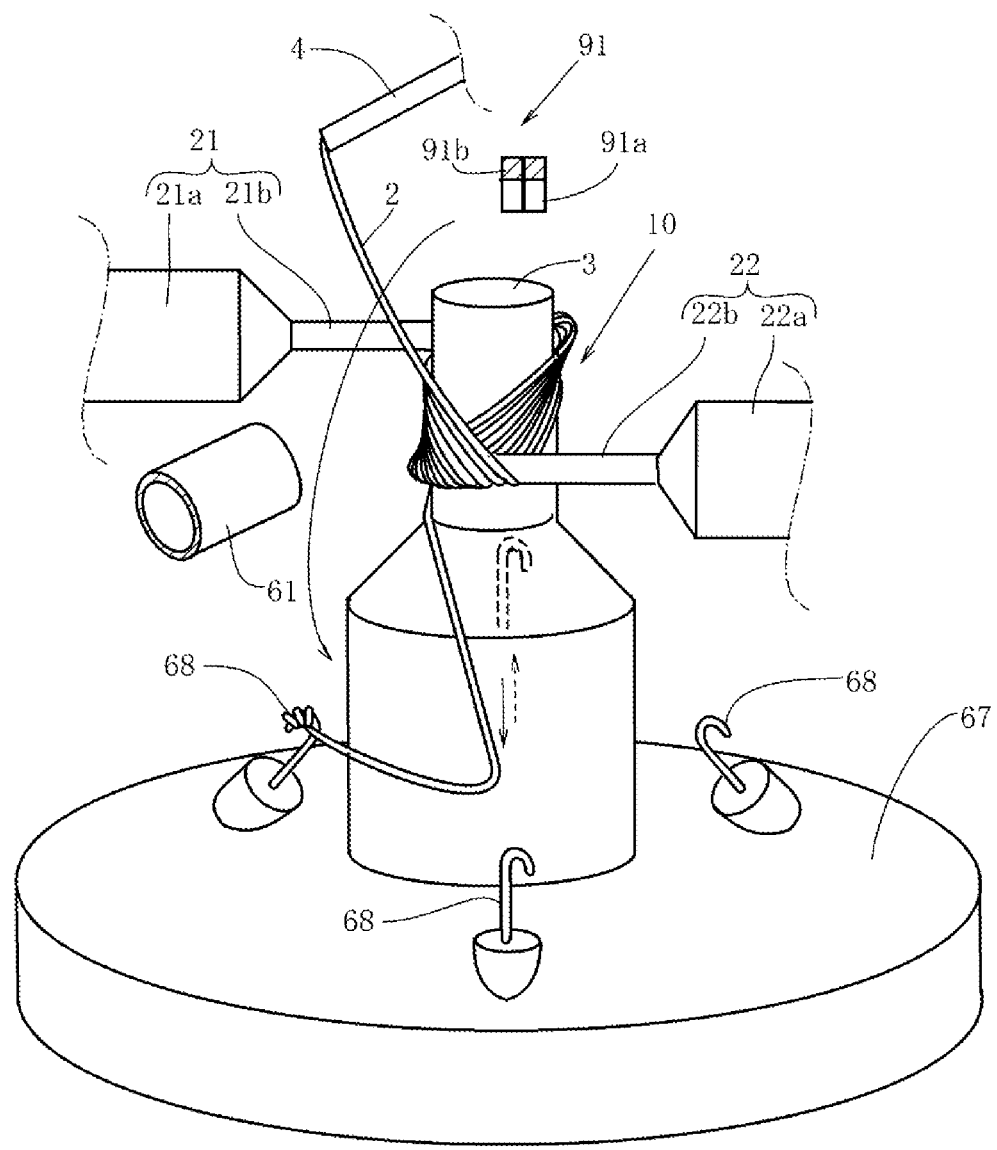
FIG. 11 is a view corresponding to FIG. 8, showing a state in which the wire is wound around one third of an outer circumference of the winding core in an embodiment of the present invention.
Figure 13:
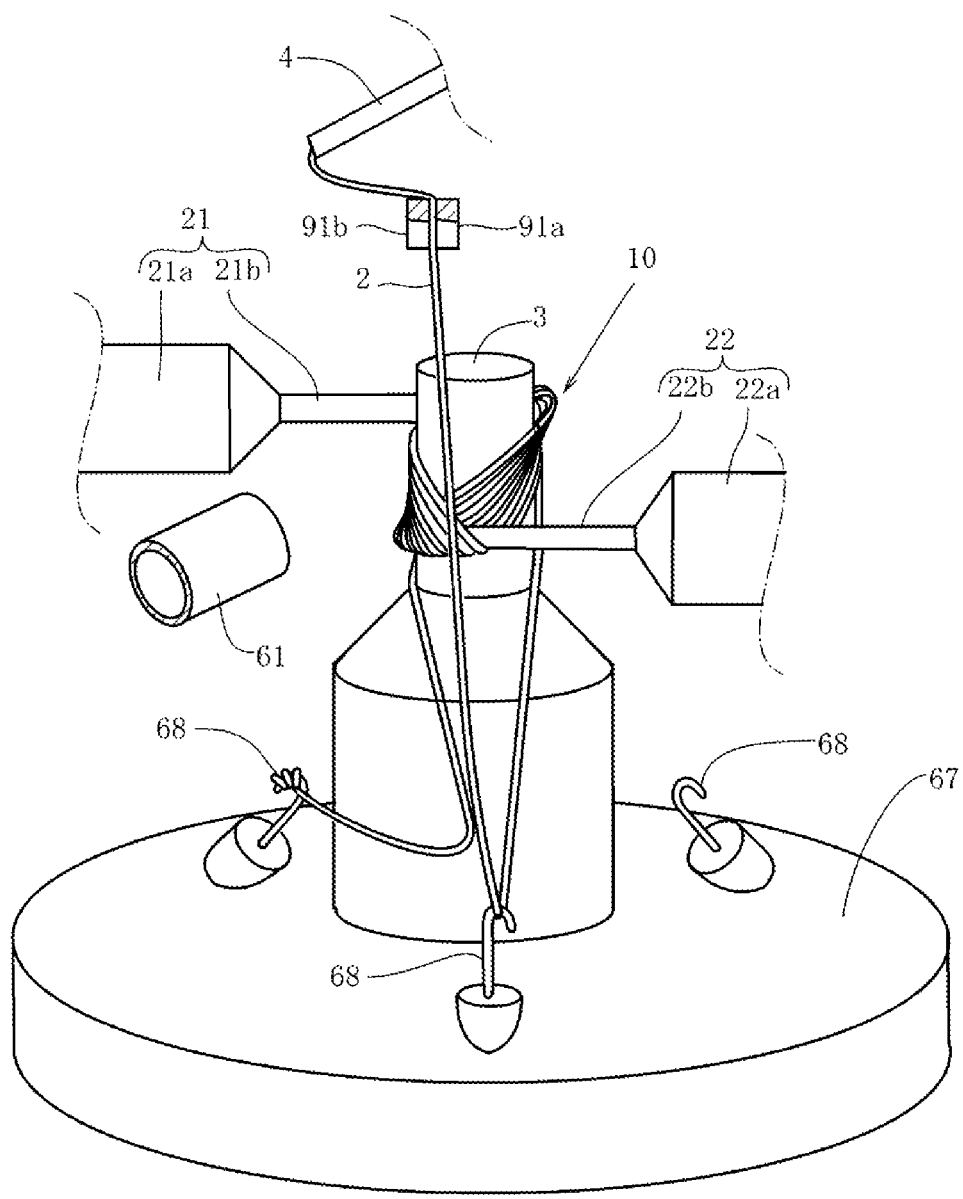
FIG. 13 is a view corresponding to FIG. 12, showing a state in which the wire hooked on the hook rod in the vicinity of the nozzle is sandwiched by hook hands in an embodiment of the present invention.

As shown in FIG. 7, the winding method of the present embodiment is a coil winding method including a winding step of rotationally moving the nozzle 4 around the winding core 3 along a track slanted with respect to a center line of the winding core 3, to successively wind the wire 2 fed through the nozzle 4 obliquely around the winding core 3 to form the coil 10, a wire hooking step of drawing out the wire 2 from an edge of the coil 10 and hooking the wire 2 on a hook rod 68 as shown in FIG. 11 to FIG. 13, and a twisting step of rotating the hook rod 68 for a predetermined number of times to twist shape the wire 2 hooked onto the hook rod 68. Specific procedures are as described below.

First, in the winding device 1, the wire 2 is drawn out through the tip of the nozzle 4 and is clamped at the clamping mechanism 15, and the winding core 3 is attached to the rotating base 19 via jigs, and further the start button of a controller not illustrated is pressed.

This causes the horizontally movable stand 17 to move, thereby moving the nozzle 4, and the wire 2 fed through the tip of the nozzle 4 is tied up to a hook-shaped part at the tip of the hook rod 68. Thereafter, the support base 26 supporting the first wire hooking member 21 and the flyer support base 13 supporting the second wire hooking member 22 are approximated to the winding core 3. Then, as shown in FIG. 7, the first and the second wire hooking members 21 and 22 serving as the pin-shaped objects having a round cross section are disposed extending in tangential directions on either side of the winding core 3 such that the plane H including both the center of rotation of the nozzle 4 and the center line of the winding core 3 is sandwiched. The first and the second wire hooking members 21 and 22 are pressed against the winding core 3 by a slight amount of energizing force.

The actual winding is started in this state. This embodiment describes a case in which three hook rods 68 are inserted obliquely through the disk section 67 and the number of lead wires a (FIG. 16) to be drawn out is three.

Figure 8:
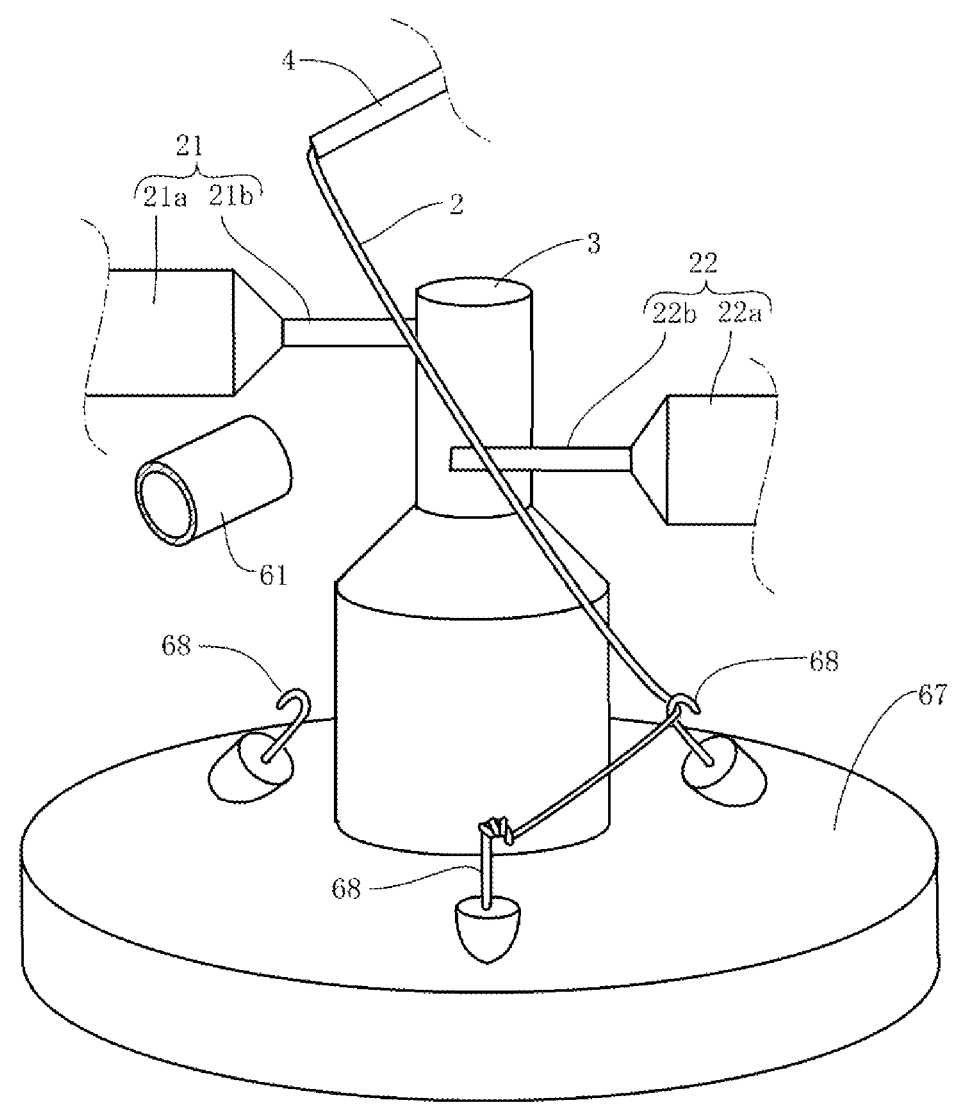
FIG. 8 is a view seen from a direction A of FIG. 7, showing a state in which wire has commenced the winding around a winding core in an embodiment of the present invention.

After moving the nozzle 4 and tying the wire 2 to the curved hook-shaped part at the tip of the hook rod 68 positioned at a starting position of the winding, the wire 2 is once hooked around a hook-shaped part of a hook rod 68 at a rear of the winding core 3 in a rotational direction, as shown in FIG. 8. Thereafter, the wire 2 is guided to the winding core 3. As such, by guiding the wire 2 to the winding core 3 after hooking the wire 2 around the rear hook rod 68 in the rotational direction, the wire 2 can be guided to the winding core 3 above the hook rod 68 that is positioned at the starting position of the winding.

In the winding step, the wire 2 is wound around the winding core 3 via the first and the second wire hooking members 21 and 22 by the nozzle 4 moving obliquely and rotationally around the winding core 3 by the flyer 5.

Here, in the present embodiment, the first and the second wire hooking members 21 and 22 serving as the pin-shaped objects are provided on either side of the winding core 3 so as to sandwich the plane H including the center of rotation of the nozzle 4 and the center line of the winding core 3, as shown in FIG. 7. This causes the wire 2 fed through the nozzle 4 to be in contact with the first and the second wire hooking members 21 and 22 at a position where the nozzle 4 is relatively separated from the plane H. Thereafter, once the nozzle 4 returns back to the plane H, the wire 2 fed through the nozzle 4 is wound around the first and the second wire hooking members 21 and 22.

Figure 9:
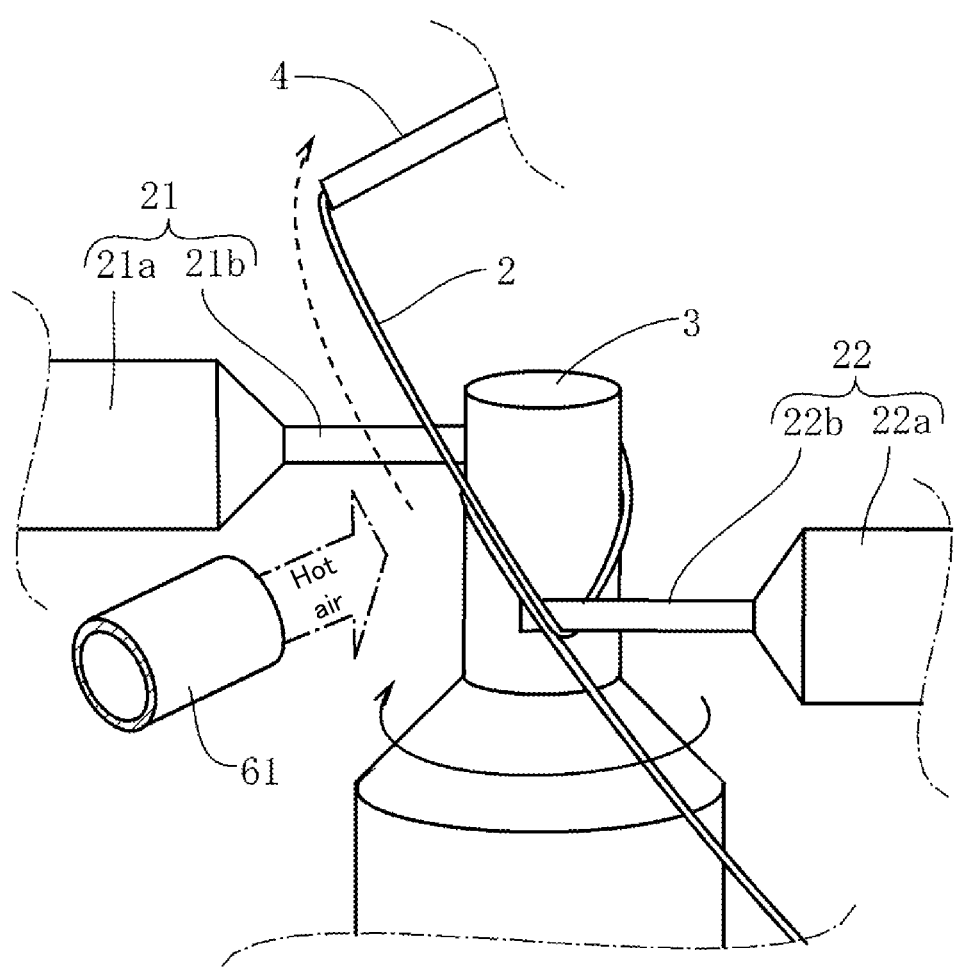
FIG. 9 is a view showing a state in which the wire is wound around the winding core once in an embodiment of the present invention.

Therefore, as shown in FIG. 9, after the nozzle 4 is once moved rotationally around the winding core 3, the wire 2 fed through the nozzle 4 will be newly hooked around the first and second wire hooking members 21 and 22. Thereafter, the newly hooked wire 2 slides along the surface of the first and the second wire hooking members 21 and 22, and becomes adjacent to the wire 2 that has already been hooked around.

Moreover, every time the nozzle 4 makes one rotation around the winding core 3, the winding core 3 is rotated together with the plurality of hook rods 68 via a rotating base 19 at a predetermined angle by the amount of the outer diameter of the wire 2.

Figure 10:
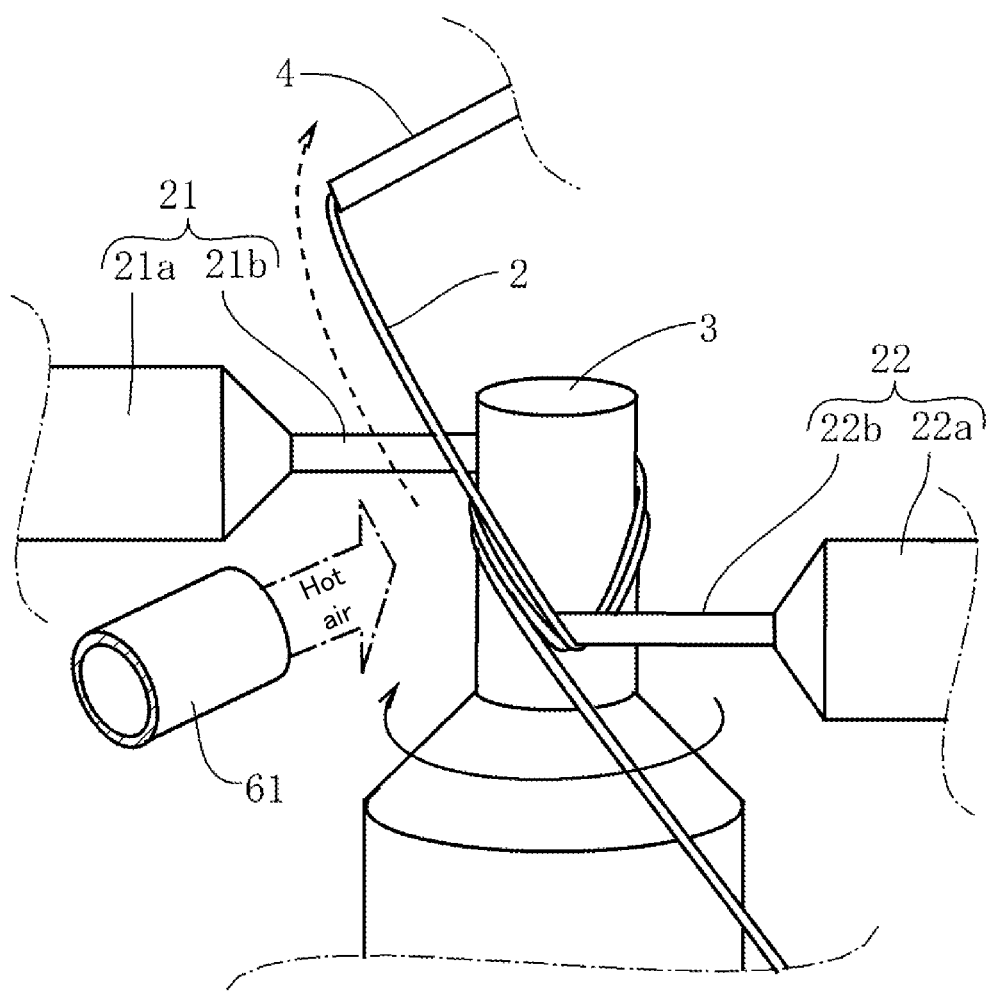
FIG. 10 is a view corresponding to FIG. 9, showing a state in which the wire is wound around the winding core twice in an embodiment of the present invention.

Therefore, as shown in FIG. 10, when the nozzle 4 further makes one rotation around the winding core 3, the wire 2 wound around the winding core 3 is also moved in the circumferential direction of the winding core 3 by the amount of the outer diameter of the wire 2. That is to say, the wire 2 wound around the first and the second wire hooking members 21 and 22 move just by the amount of the outer diameter of the wire 2 towards the tip of the first and the second wire hooking members 21 and 22.

The wire 2 fed through the nozzle 4 is newly hooked around the first and the second wire hooking members 21 and 22, and slides along the surface of the first and second wire hooking members 21 and 22 to further be adjacent to the wire 2 moved towards the tip of the first and second wire hooking members 21 and 22.

In this case, the first and the second wire hooking members 21 and 22 are merely pressed against the winding core 3 by a slight amount of energizing force caused by the spring 24 in the abutting angle changing mechanism, so the first and the second wire hooking members 21 and 22 can be swung in a direction passing over the wire 2 wound around the winding core 3. Therefore, the movement of the wire 2 hooked around the first and the second wire hooking members 21 and 22 will not be interfered by the first and the second wire hooking members 21 and 22.

As such, the rotation of the winding core 3 as shown in the solid line arrows causes the wire 2 hooked around the first and the second wire hooking members 21 and 22 to move in the tip direction of the first and the second wire hooking members 21 and 22. In addition, the oblique rotational movement of the nozzle 4 around the winding core 3 as shown in the broken line arrows causes the wire 2 to be newly hooked around the first and the second wire hooking members 21 and 22 at a position where the firstly hooked wire 2 is moved in the tip direction of the first and the second wire hooking members 21 and 22.

Therefore, the newly wound wire 2 will be arranged tightly in contact with and with no space between the wire 2 that has been already wound onto the first and the second wire hooking members 21 and 22.

The wire 2 tightly in contact with each other and wound around the winding core 3 between the first and the second wire hooking members 21 and 22 is then subjected to hot air flow from the duct 61. This causes the welding layer coated on the surface of the wire 2 to melt, and adjacent parts of the wire 2 wound around the winding core 3 become adhered to each other.

Moreover, the nozzle 4 moves obliquely rotationally around the winding core 3 as shown in the broken line arrows, and the winding core 3 rotates as shown in the solid line arrows. As a result, the wire 2 successively hooked around the first and the second wire hooking members 21 and 22 successively move in the tip direction of the first and the second wire hooking members 21 and 22, and is guided to an outer surface of the winding core 3 at a stage where the wire 2 is detached from the tip.

As such, the wire 2 successively wound around the first and the second wire hooking members 21 and 22 together with the rotational movement of the nozzle 4 will be successively guided to the winding core 3 in an aligned state. This thus enables what is called a regular winding, in which the wire 2 is wound in a sequentially adjacent state, regardless of the diameter of the wire 2.

Moreover, the wire 2 fed through the nozzle 4 is guided to the winding core 3 after being wound and hooked on the first and the second wire hooking members 21 and 22 being the pin-shaped objects, by being slipped off from the tip. Hence, even if the wire 2 has a relatively large diameter, the wire 2 will be guided to the winding core 3 after being wound around the first and the second wire hooking members 21 and 22. Accordingly, the wire 2 can be wound sufficiently even in a case of a relatively thick wire.

Moreover, different outer diameters of the wire 2 can be dealt with by just changing the rotational speed of the winding core 3. The rotational speed of the nozzle 4, the rotational speed of the winding core 3, and the number of rotations can be set relatively freely in the winding device 1, and thus the winding can be carried out in accordance with the specification of the desired coil 10 (FIG. 16).

Furthermore, by adjusting a gap between the upper first wire hooking member 21 and the lower second wire hooking member 22 positioned upper and lower of the winding core 3, the length of the coil 10 (FIG. 16) in the axis direction of the winding core 3 can be set accurately and easily.

Here, the wire 2 wound around the winding core 3 across the first and the second wire hooking members 21 and 22 are closely in contact with each other, so by having a longer time until the wire 2 is guided to the winding core 3, it is possible to more securely fuse the wire 2 closely in contact with each other by the hot air.

In this embodiment, the first and the second wire hooking members 21 and 22 made of the pin-shaped objects are in contact with the outer circumference of the winding core 3, or alternatively, has a length L (FIG. 7) that is 1.5 to 3 times the diameter of the wire 2, which length L is a length from a shortest point that the first and the second wire hooking members 21 and 22 come closest to the winding core 3, to the tips of the first and the second wire hooking members 21 and 22. This makes the wire 2 successively hooked around the first and the second wire hooking members 21 and 22 to be guided to the winding core 3 from its tip after the wire 2 is hooked around the first and the second wire hooking members 21 and 22 made of the pin-shaped objects twice or three times.

After the nozzle 4 is moved rotationally for a predetermined number of times and the wire 2 is wound around for a predetermined number of times to one part of the outer circumference of the winding core 3 (in this embodiment, one third of the outer circumference) to form the coil 10, the wire 2 is then drawn out from the edge of the coil 10 to carry out the wire hooking step of hooking the wire 2 to the hook rod 68.

In the wire hooking step, after the wire 2 is wound around for a predetermined number of times to one part of the outer circumference (in this embodiment, one third of the outer circumference) of the winding core 3 in the aforementioned winding step, the wire 2 is drawn out from the edge of the coil 10 and is hooked on the hook rod 68.

That is to say, when the wire 2 is wound around for a predetermined number of times, the hook rod 68 and the lock rod 80 will be positioned on a line extending from the gear 79 and the unlock rod 88, as shown in FIG. 1 and FIG. 3.

This hook rod 68 has the wire 2 at the start of the winding hooked in advance; the hooked wire 2 is taken off the hook rod 68 by firstly rotating the hook rod 68 in a raised state once.

The hook rod 68 is raised by moving the air cylinder 89 in an extending manner in predetermined large strokes to move the tap movable stand 86 upwards, to push the hook rod 68 up from an initial position (set in advance) to a predetermined position (detaching position where the wire is detached) as shown in the broken lines in FIG. 11. When the air cylinder 87 is moved in an extending manner in this state, the unlock rod 88 pushes the lock rod 80 upwards. This releases the rotational regulation of the hook rod 68.

Thereafter, the twisting motor 78 is rotated for a predetermined number of times (approximately once) in this state; this rotation is transmitted through the gears 79 and 70 and causes the hook rod 68 to rotate, thus allowing for the wire 2 hooked on the hook rod 68 to come off from the hook rod 68.

Thereafter, the air cylinder 89 is shrunk to push down the hook rod 68 to the initial position shown in the solid lines. Furthermore, the air cylinder 87 is shrunk to push down the lock rod 80, to engage the rotation regulating member 83 to the outer circumference concave portion 70a of the gear 70. By lowering the hook rod 68 to the initial position and engaging the rotation regulating member 83 to the outer circumference concave portion 70a of the gear 70 (FIG. 4) as such, the rotation of the hook rod 68 is prohibited.

A feature of the present embodiment is that in the wire hooking step, the wire 2 hooked across the edge of the coil 10 and the nozzle 4 is hooked to the hook hand 91, and that the hook hand 91 is moved in the directions of the three axes to hook the wire 2 hooked on the hook hand 91 onto the hook rod 68.

The hook hand 91 of this embodiment includes a first hook member 91a and a second hook member 91b that can be contacted with each other and to which the wire 2 hooked across the edge of the coil 10 and the nozzle 4 can be hooked in the contacted state.

Therefore, as shown in FIG. 11, the wire 2 can be hooked on the first and the second hook members 91a and 91b in the contacted state by moving the first and the second hook members 91a and 91b in the contacted state with the moving mechanism 95 (FIG. 1) as shown in the solid line arrows. By moving the first and the second hook members 91a and 91b in the contacted state as such, the wire 2 can be newly drawn out from the nozzle 4.

As shown in FIG. 12, in this wire hooking step, the first and the second hook members 91a and 91b hooked the wire 2 are separated thereafter. By separating the first and the second hook members 91a and 91b that are hooked with the wire 2, the wire 2a will be hooked across the separated first and second hook members 91a and 91b.

Therefore, by being moved by the moving mechanism 95 in this state and hooking the wire 2a hooked across the separated first and second hook members 91a and 91b onto a curved hook-shaped part upper of the hook rod 68, the wire 2 can be hooked on the hook rod 68.

As such, by drawing the wire 2 out from the edge of the coil 10 and hooking it on the hook rod 68 by the wire drawing-out mechanism 90, it is possible to carry out the hooking of the wire 2 in this wire hooking step quickly and securely.

In this embodiment, the first and the second hook members 91a and 91b following the hooking of the wire 2a onto the hook rod 68 hold the wire 2 in the vicinity of the nozzle 4 as shown in FIG. 13. In this case, the first and second hook members 91a and 91b desirably hold the wire 2 drawn out from the end part of the coil 10 and hooked on the hook rod 68 and the wire 2 fed via the nozzle 4 at substantially identical angles, that is to say, at a position where the two pieces of wire 2 are held close to each other. This enables uniform twisting the two pieces of wire 2.

Twist shaping the two pieces of wire 2 in a uniform state reduces the possibility of any breaking of the wire 2, which breaking is caused by twisting in a state in which one piece of the wire 2 is wound around another piece of the wire 2, and allows for achieving an effect of carrying out the twist formation stably.

Thereafter, the twisting step is carried out, of twist shaping the wire 2 by rotating the hook rod 68 for a predetermined number of times.

Figure 14:
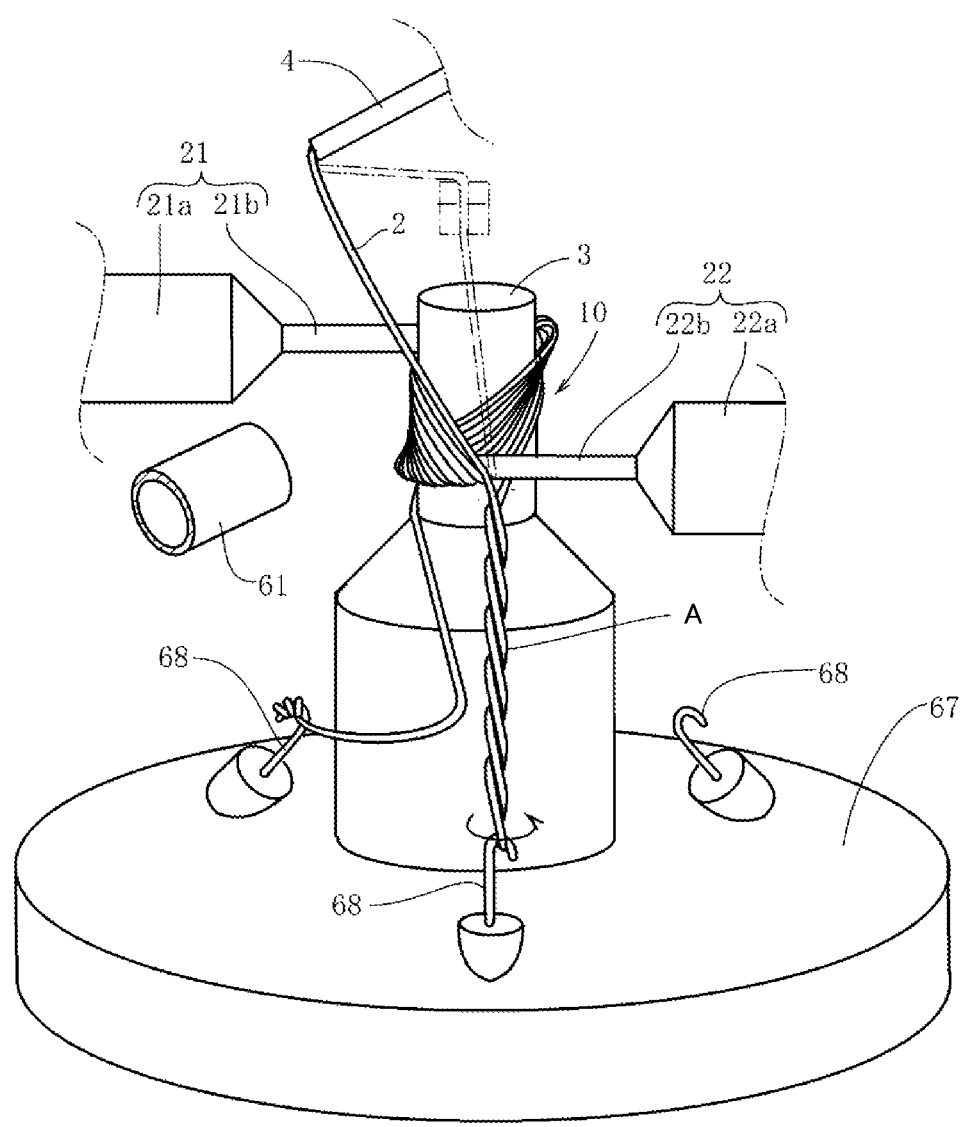
FIG. 14 is a view corresponding to FIG. 13, showing a state in which a hook rod is rotated and the wire is twisted, thereby forming a lead wire in an embodiment of the present invention.

In this twisting step, the lock rod 80 is maintained in a state moved upwards by the air cylinder 87 (FIG. 3). The twisting motor 78 is rotated for a predetermined number of times in this state to twist the wire 2 between the hook rod 68 and the coil 10 by a predetermined number of turns as shown in FIG. 14, thus forming the lead wire A. When the upper end of the twist shaped lead wire reaches the second wire hooking member 22 serving as the pin-shaped object, this twist shaping is terminated.

Accordingly, in this twisting step, the second wire hooking member 22 disposed extending in the tangential direction of the winding core 3 is entered into a crossing part of the wire 2 to be twisted. This second wire hooking member 22 defines a range of the wire 2 to be twisted, and prevents the wire 2 that forms the coil 10 from being twisted. This allows for avoiding any deformation in the coil 10.

After the predetermined twisting is terminated, the rotation regulating member 83 is engaged with the outer circumference concave portion 70a of the gear 70 as shown in FIG. 4, to prohibit the rotation of the hook rod 68.

In addition, the first and the second hook members 91a and 91b holding the wire 2 in the vicinity of the nozzle 4 are separated to release the holding state, and thus the wire 2 is detached from the hook hand 91. Furthermore, the hook hand 91 is moved to a standby position separated from the winding core 3, by the moving mechanism 95 (FIG. 1).

Thereafter, the winding step is started again, and the wire 2 fed through the nozzle 4 around the winding core 3 is secured by the first and the second wire hooking members 21 and 22, to be wound around again.

In this restarted winding step, every time the wire 2 is wound around, the winding core 3 is rotated by the rotating base 19, and the hook rod 68 that drew out the lead wire A and other hook rods 68 are also rotated together with the rotating base 19.

After the winding is successively carried out until the angle at which the next lead wire A is drawn is reached as such, a subsequent wire hooking step carries out similar operations to those shown in FIG. 11 to FIG. 13, and draws out the wire 2 from the edge of the coil 10 and hooks it on the hook rod 68.

Thereafter, the twisting step is again carried out to again twist shape the wire 2 drawn out and wound on the hook rod 68, to form the lead wire A.

Figure 15:
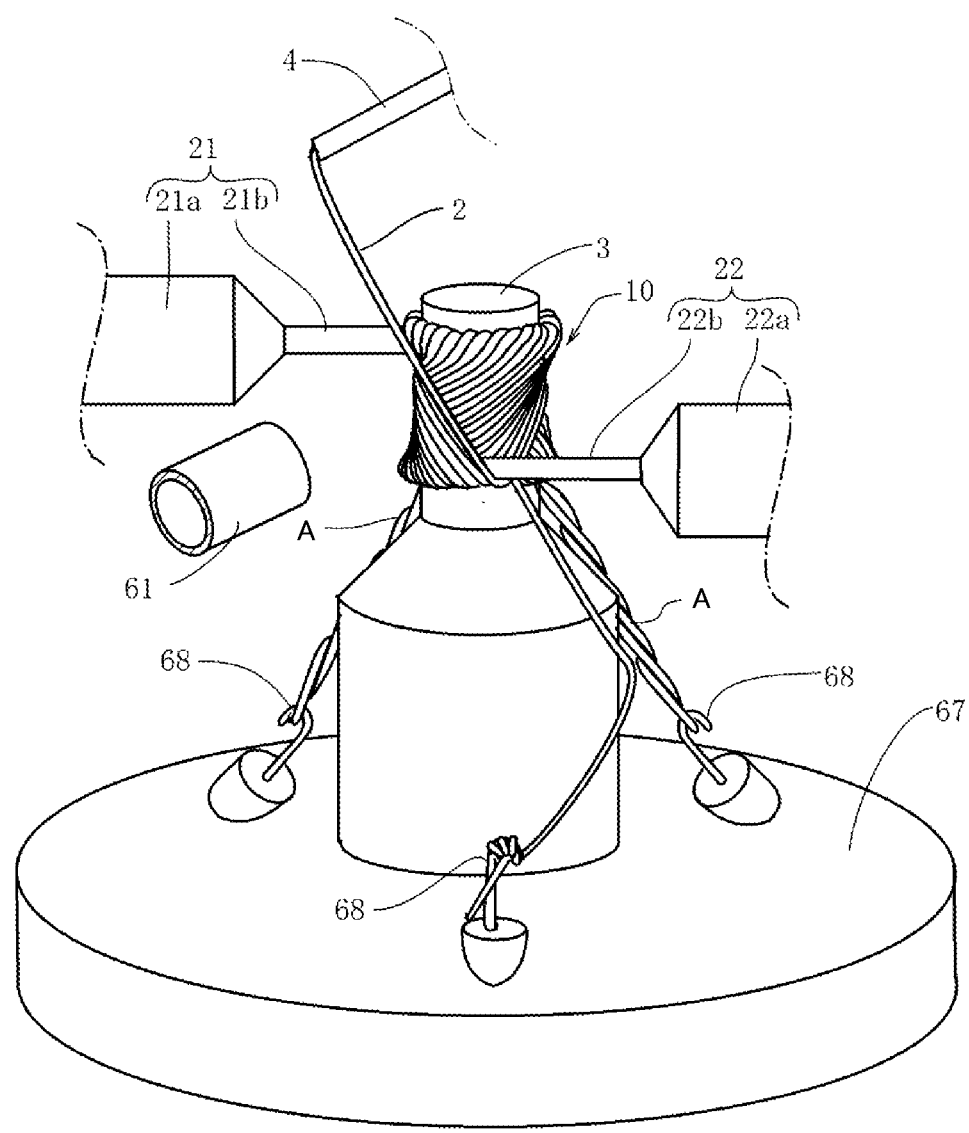
FIG. 15 is a view corresponding to FIG. 8, showing a state in which the wire is wound around the entire outer circumference of the winding core in an embodiment of the present invention.

As described above, upon repeating the predetermined number of wire hooking steps, twisting steps and winding steps, the coil 10 made of the wire 2 wound around the whole periphery of the winding core 3 as shown in FIG. 15 is obtained.

After obtaining such a coil 10, the first and the second wire hooking members 21 and 22 are slipped off from the coil 10. Then, as shown in FIG. 16, the nozzle 4 is drawn around, and after hooking the wire 2 on the hook rod 68 in the rotational direction of the winding core 3, the wire at the end of the winding is tied to the hook rod 68 onto which the wire 2 was first tied. Thereafter, the wire 2 fed through the nozzle 4 at the tip of the flyer 5 is locked to the clamping mechanism 15, and is cut between the hook rod 68 and the clamping mechanism 15.

The wire 2 hooked around the hook rod 68 in the rotational direction of the winding core 3 is then taken off from the hook rod 68. The wire 2 can be taken off the hook rod 68 by rotating the hook rod 68 in a raised state.

Thereafter, the hook rod 68 is rotated to twist the wire 2 tied at the start of the winding and the wire 2 tied at the end of the winding on the hook rod 68, thus forming a lead wire.

In this case, the wire 2 at the start of the winding is tied after the wire 2 is hooked around a hook rod 68 adjacent to the tied hook rod 68, and the wire 2 at the end of the winding is also tied after the wire 2 is hooked around the hook rod 68 disposed in the rotational direction. Therefore, the wire 2 at the start of the winding and the wire 2 at the end of the winding, each tied on that hook rod 68, are both in a loose state.

Figure 17:
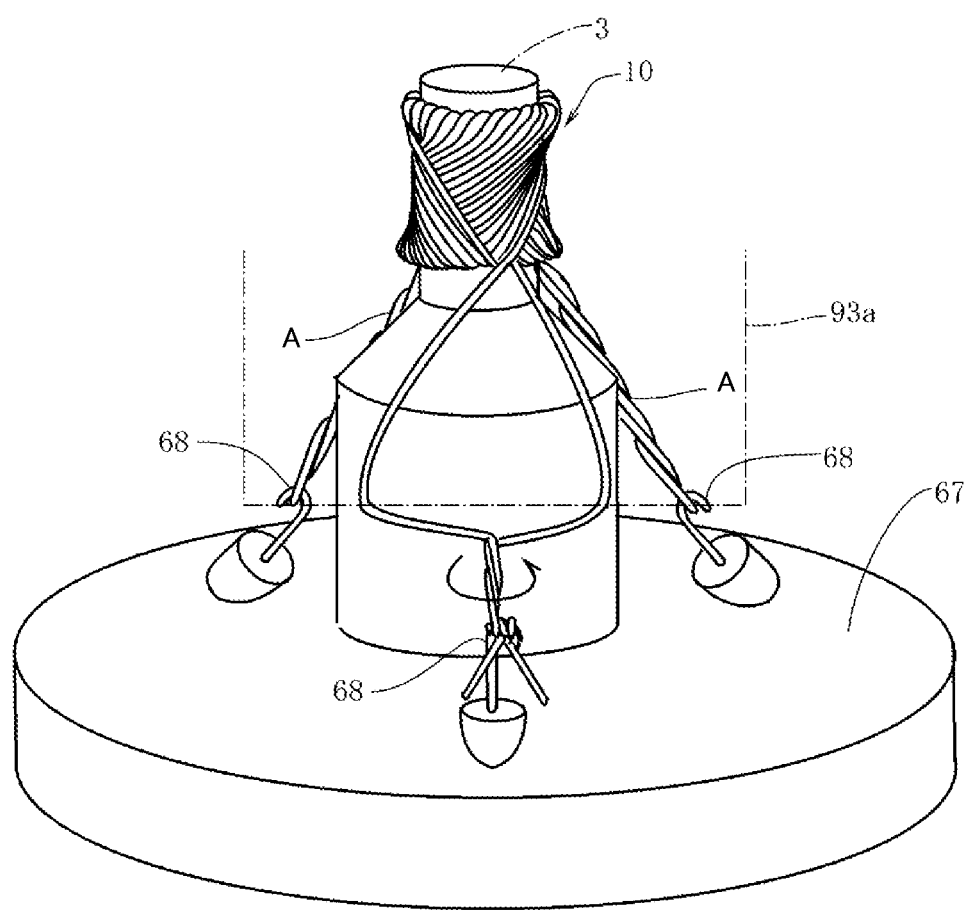
FIG. 17 is a view corresponding to FIG. 8, showing a state in which the wire completed in its winding is pressed by a pressing member together with the wire at the beginning of the winding to eliminate any slack in an embodiment of the present invention.

Therefore, in the twisting step of the wire 2 of the start of the winding and the wire 2 of the end of the winding, as shown in FIG. 17, the pressing member 93a is pressed against both of the wire 2 of the start of the winding and the wire 2 of the end of the winding, each of which are disposed between the hook rod 68 to be rotated and the coil 10, to eliminate any slack of the wire 2 between the hook rod 68 to be rotated and the coil 10.

Thereafter, the hook rod 68 is rotated for a predetermined number of times in this state, to twist shape the wire 2 of the start of the winding and the wire 2 of the end of the winding.

Figure 18:
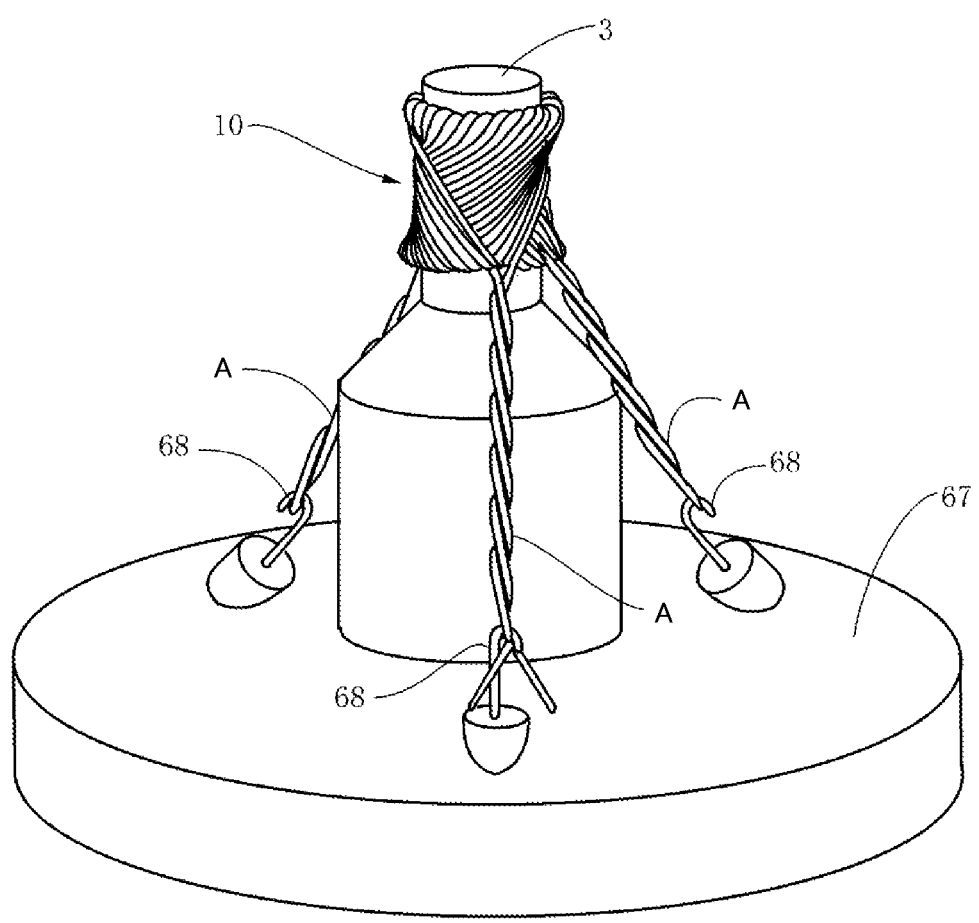
FIG. 18 is a view corresponding to FIG. 8, showing a state in which all the lead wires are formed in the coil in an embodiment of the present invention.

After the slack in the wire 2 between the hook rod 68 and the coil 10 is eliminated to a certain degree, the pressing member 93a is separated from these pieces of wire 2. Thereafter, the hook rod 68 is rotated for a predetermined number of times to twist the wire 2 of the start of the winding and the wire 2 of the end of the winding, thereby forming the lead wire A as shown in FIG. 18.

Even if the wire 2 of the start of the winding and the wire 2 of the end of the winding is tied to the hook rod 68 in a loose state, it is possible to eliminate the slack of the wire 2 between the hook rod 68 and the coil 10 by pressing the pressing member 93a against the wire 2 between the hook rod 68 and the coil 10.

Further, in a state in which the slack is eliminated as such, the hook rod 68 is rotated to twist shape the wire 2, to enable accurate twisting of the wire 2 between the hook rod 68 and the coil 10 in a predetermined pitch.

As such, the winding step, the wire hooking step that draws out the wire 2 and hooks it on the hook rod 68, and the twisting step that twist shapes the wire 2 by rotating the hook rod 68 for a predetermined number of times enable automatic shaping of the lead wire A in which the lead wire A is formed by winding the wire 2, drawing out the wire 2, and further twisting the wire 2.

Moreover, the winding device 1 of the present embodiment automatically carries out the shaping of the lead wire A, by drawing out the wire 2 and twisting the wire 2. Therefore, none of the following would occur that may occur in the case of manual operation: the wire loosening from the base end section of the lead wire before the wire 2 is twisted; the twisted amount of the wire 2 being uneven; the wire 2 moving before soldering due to insufficient twisting; or the wire 2 breaking caused by too much twisting. Accordingly, it is possible to form the lead wire A easily and accurately.

Further, although the rotational movement of the nozzle 4 is once stopped to draw out the lead wire A in the coil winding device and winding method as like the present embodiment, the wire 2 hooked across the nozzle 4 and the edge of the coil 10 is hooked on the hook hand 91, and the hook hand 91 is moved in the directions of the three axes to hook the wire 2 on the hook rod 68, so the rotational movement of the nozzle 4 will not started again to hook the wire 2 on the hook rod 68.

Therefore, there will be no increase in time caused by the repetition of the starting and stopping of the rotational movement of the nozzle 4 for drawing out the wire 2, which was traditionally understood as a requirement, and thus allows for shortening the time required to form the lead wire A.

After the coil 10 is formed, the twist shaped lead wire A needs to be taken off from the hook rod 68 to slide off the winding core 3 from the coil 10. The twist shaped lead wire A can be taken off from the hook rod 68 by rotating the hook rod 68 in a raised state.

This concludes the description of the embodiment of the present invention. It should be noted that the above-described embodiment merely illustrates one application example of the present invention, and is not intended to limit a technical scope of the present invention to specific configurations of the above-described embodiment.

This application claims priority based on Japanese Patent Application No. 2014-59631 filed with the Japan Patent Office on Mar. 24, 2014, the entire contents of which are incorporated into this specification.

What is claimed is:

1. A coil winding device comprising:
    a nozzle configured to feed a wire to successively wind the wire obliquely around the winding core to form a coil by moving rotationally around a winding core along a track slanted with respect to a center line of the winding core;
    a plurality of hook rods disposed in predetermined intervals around an end part of the winding core, the wire drawn out from an edge of the coil being configured to be hooked to each of the plurality of hook rods during a forming process of the coil;
    a winding core rotating mechanism configured to rotate the winding core together with the plurality of hook rods;
    a hook rod rotating mechanism configured to rotate the plurality of the hook rods separately from the winding core to twist the wire hooked onto the hook rods; and
    a wire drawing-out mechanism configured to draw out the wire from the edge of the coil and hook the wire on the hook rods during the forming process of the coil,
    the wire drawing-out mechanism comprising:
        a hook hand being capable of hooking the wire hooked across the edge of the coil and the nozzle on the hook rods; and
        a moving mechanism configured to move the hook hand in directions of three axes,
    wherein the hook hand includes a first hook member and a second hook member capable of being contacted with each other and separated from each other, respectively.

2. The coil winding device according to claim 1, wherein each of the first hook member and the second hook member is capable of hooking the wire hooked across the edge of the coil and the nozzle in a contacted state,
    the wire drawing-out mechanism further comprises an contacting and separating mechanism configured to enable the first and the second hook members to move between the contacted state and a separated state, and
    the moving mechanism is configured to enable movement of the hook hand so that the wire hooked across the separated first and second hook members is hooked on the hook rods.

3. The coil winding device according to claim 1, further comprising:
    a pressing member disposed in the vicinity of the hook hand, movable in directions of three axes by the moving mechanism together with the hook hand.

4. The coil winding device according to claim 1, further comprising:
    a pin-shaped object disposed extending in a tangential direction of the winding core, being capable of entering a crossing part of the wire to be twisted in the process in which the wire is twist shaped.

5. The coil winding device according to claim 1, further comprising a first wire hooking member on one side of the winding core and a second wire hooking member on an opposite side of the winding core, the first and second wire hooking members configured such that during the forming process of the coil, the first wire hooking member defines an upper end of the coil and the second wire hooking member defines a lower end of the coil,
    wherein the hook hand is moveable above the first wire hooking member to draw out the wire from the edge of the nozzle and below the second wire hooking member to hook the wire onto the hook rods.

6. A coil winding method, comprising:
    drawing out, with a hook hand, a wire from a nozzle;
    successively winding the wire fed through the nozzle moved rotationally around a winding core along a track slanted with respect to a center line of the winding core, the wire being wound obliquely around the winding core to form a coil;
    hooking, by the hook hand, the wire drawn out from an edge of the coil on a hook rod; and
    twisting the wire hooked on the hook rod by rotating the hook rod for a predetermined number of times,
    wherein the hooking hooks the wire hooked across the edge of the coil and the nozzle on the hook hand, and moves the hook hand in directions of three axes to hook the wire hooked on the hook hand on the hook rod.

7. The coil winding method according to claim 6, wherein the hook hand comprises a first hook member and a second hook member capable of being contacted with each other, each of which being capable of hooking the wire hooked across the edge of the coil and the nozzle in the contacted state, in the hooking, the first and second hook members on which the wire is hooked are separated, and the wire hooked across the separated first and second hook members is hooked on the hook rod.

8. The coil winding method according to claim 6, wherein in the twisting, the hook rod is rotated for a predetermined number of times to twist shape the wire in a state in which the wire between the hook rod and the coil is pressed by a pressing member to eliminate any slack in the wire between the hook rod and the coil.

9. The coil winding method according to claim 6, wherein in the twisting, a pin-shaped object disposed extending in a tangential direction of the winding core is entered into a crossing part of the wire to be twisted.

10. The coil winding method of claim 6, wherein drawing out the wire from a nozzle and hooking the wire on a hook rod includes drawing out the wire from the nozzle with the hook hand above a height of the winding core, moving the hook hand with the drawn out wire to a height below the winding core, and hooking, with the hook hand, the wire onto the hook rod at a height below the winding core.

\* \* \* \* \*